(12) United States Patent
Iwamoto et al.

(10) Patent No.: US 7,966,157 B2
(45) Date of Patent: Jun. 21, 2011

(54) SIGNAL PROCESSING CIRCUIT FOR ROTATION DETECTOR AND METHOD FOR DETECTING ROTATION OF OBJECT

(75) Inventors: Reiji Iwamoto, Nagoya (JP); Satoshi Ohi, Osaka (JP)

(73) Assignee: DENSO CORPORATION, Kariya (JP)

( * ) Notice: Subject to any disclaimer, the term of this patent is extended or adjusted under 35 U.S.C. 154(b) by 480 days.

(21) Appl. No.: 12/230,617

(22) Filed: Sep. 2, 2008

(65) Prior Publication Data

US 2009/0063103 A1 Mar. 5, 2009

(30) Foreign Application Priority Data

Sep. 3, 2007 (JP) ................................. 2007-228165
Sep. 12, 2007 (JP) ................................. 2007-236985

(51) Int. Cl.
*H04B 15/00* (2006.01)
*G01R 35/00* (2006.01)

(52) U.S. Cl. ........ 702/190; 123/479; 318/712; 324/174; 702/106

(58) Field of Classification Search ............ 702/69, 702/70, 72, 85, 106, 124, 127, 145, 151, 702/189, 190, 191; 73/114.26, 862.326; 123/179.1, 479, 631; 318/400.01, 560, 712; 324/174

See application file for complete search history.

(56) References Cited

U.S. PATENT DOCUMENTS

| | | | |
|---|---|---|---|
| 7,159,571 B2 | 1/2007 | Kassner | |
| 7,294,988 B2* | 11/2007 | Ajima et al. | 318/712 |
| 7,466,123 B2* | 12/2008 | Kato et al. | 324/174 |
| 2005/0066749 A1 | 3/2005 | Hara et al. | |
| 2007/0139036 A1 | 6/2007 | Kondo | |

FOREIGN PATENT DOCUMENTS

| | | |
|---|---|---|
| JP | A-04-009780 | 1/1992 |
| JP | A-08-237099 | 9/1996 |
| JP | A-2000-134070 | 5/2000 |
| JP | A-2006-234504 | 9/2006 |

\* cited by examiner

*Primary Examiner* — John H Le
(74) *Attorney, Agent, or Firm* — Posz Law Group, PC

(57) ABSTRACT

A signal processing circuit for a rotation detector outputs accurate rotational information including a rotating direction of a rotor which rotates with an object. A phase difference compensation substantiating block decides whether a predetermined phase difference compensating condition is established. The condition relates to decision whether noise effects on first and second filter signals in first and second filter blocks are different from each other. When the phase difference compensating condition is established, the phase difference compensation substantiating block corrects the phase relationship between first and second phase difference compensation output signals so that the phase relationship is identical to that attained just before the phase difference compensating condition is established.

26 Claims, 17 Drawing Sheets

AT TIME OF REVERSE

AT TIME OF REVERSE

AT TIME OF REVERSE

AT TIME OF REVERSE

AT TIME OF REVERSE

AT TIME OF REVERSE

AT TIME OF REVERSE

AT TIME OF REVERSE

SIGNAL PROCESSING CIRCUIT FOR ROTATION DETECTOR AND METHOD FOR DETECTING ROTATION OF OBJECT

CROSS REFERENCE TO RELATED APPLICATIONS

This application is based on Japanese Patent Applications No. 2007-228165 filed on Sep. 3, 2007, and No. 2007-236985 filed on Sep. 12, 2007, the disclosures of which are incorporated herein by reference.

FIELD OF THE INVENTION

The present invention relates to a signal processing circuit for a rotation detector and a method for detecting rotation of an object.

BACKGROUND OF THE INVENTION

As for a signal processing circuit of a rotation detecting device, a technology described in, for example, a patent document 1, that is, JP-A-2006-234504 has been known in the past. The signal processing circuit of a rotation detecting device includes: first and second magnetic sensors that are disposed to be opposed to the periphery of a rotor, which rotates together with, for example, the tires of an automotive vehicle, in order to output rotational signals associated with the turning angles of the rotor, and that are formed with, for example, magnetoresistive elements (MREs); first and second waveform reshaping units that output the rotational signals, which are fetched from the first and second magnetic sensors, as first and second pulsating signals which have a phase difference of ¼; a rotating direction deciding unit that decides the rotating direction of the rotor on the basis of the first and second pulsating signals fetched from the first and second waveform reshaping units respectively, and outputs a direction deciding signal which represents the decided rotating direction; and a first output terminal through which the first pulsating signal outputted from the first waveform reshaping unit is outputted as it is. Moreover, the signal processing circuit of a rotation detecting device further includes an output deciding circuit that when the direction deciding signal representing the reverse rotation of the rotor is outputted from the rotating direction deciding unit, outputs the first pulsating signal, which is fetched from the first waveform reshaping unit, to a second output terminal without any change, and that when the direction deciding signal representing the normal rotation of the rotor is outputted from the rotating direction deciding unit, outputs a constant signal to the second output terminal in place of the first pulsating signal fetched from the first waveform reshaping unit. Consequently, when the rotating direction of the rotor is the direction of normal rotation, the first pulsating signal is outputted from the first waveform reshaping unit to the first output terminal, and the constant signal is outputted from the output deciding circuit to the second output terminal. On the other hand, when the rotating direction of the rotor is the direction of reverse rotation, the first pulsating signal is outputted from the first waveform reshaping unit to the first and second output terminals. Thus, rotational information including the rotating direction of the rotor is produced based on a combination of kinds of signals to be outputted to the first and second output terminals. The rotational information is outputted to, for example, an electronic control unit (ECU) for vehicle control which is connected in a stage succeeding the signal processing circuit of a rotation detecting device.

The technology described in the patent document 1 does not take measures against noise that is superposed on rotational signals to be transferred between the first and second magnetic sensors and the first and second waveform reshaping circuits. Consequently, when first and second rotational signals are transmitted from the first and second magnetic sensors to the first and second waveform reshaping circuits, if noise is superposed on the first and second rotational signals, the rotating direction deciding circuit decides the rotating direction of the rotor on the basis of the first and second pulsating signals that are produced by reshaping the first and second rotational signals on which the noise is superposed. Consequently, there is a fear that the precision in decision on the rotating direction of the rotor may be degraded due to the noise superposed on the rotational signals.

Interposition of a noise removing circuit described in, for example, a patent document 2, that is, JP-A-2000-134070 between each of the first and second waveform reshaping circuits and the rotating direction deciding unit is conceivable. Incidentally, the noise removing circuit described in the patent document 2 includes: eight D flop-flops that sequentially delays by a predetermined time digital input signals (herein first and second pulsating signals outputted from the first and second waveform reshaping circuits); an AND circuit that outputs an output signal equivalent to the AND of the output signals of the eight D flip-flops; a NOR circuit that outputs an output signal equivalent to the negative OR of the output signals of the eight D flop-flops; and an SR flop-flop having the output terminal of the AND circuit and the output terminal of the NOR circuit connected to the reset terminal and set terminal thereof respectively. Consequently, the adverse effect of the noise, which is superposed on the first and second rotational signals, on the precision in the decision performed on the rotating direction of the rotor by the rotating direction deciding circuit can be minimized.

However, when the foregoing technologies described in the patent documents 1 and 2 are used in combination, a problem described below may arise.

Specifically, since the D flop-flops (delayers) are employed in the noise removing circuit described in the patent document 2, the phases of the rotational signals having the noises thereof removed by the noise removing circuit lag by a predetermined time behind the phases of the rotational signals outputted from the first and second waveform reshaping circuits. The predetermined time depends on the delay time offered by the delayers.

Herein, assume that before the predetermined time elapses with a time point, at which the signal level of the first pulsating signal outputted from the first waveform reshaping circuit is changed from a signal level associated with a logical high state to a signal level associated with a logical low state, regarded as an initial point, the adverse effect of the noise superposed on the first rotational signal is manifested and the signal level of the first pulsating signal is changed to the signal level associated with the logical high state. At this time, the noise shall also be superposed on the second rotational signal but the adverse effect of the noise shall not be manifested in the second pulsating signal. Incidentally, this situation does not take place under special circumstances. Since predetermined thresholds specified in the first and second waveform reshaping circuits are used to reshape the waveforms of the first and second rotational signals, which are analog signals, into the waveforms of the first and second pulsating signals, it is a matter of commonplace that the adverse effect of the noise is manifested in only one of the pulsating signals.

In the foregoing situation, the phase of a first filtered signal having the noise thereof removed by a noise removing circuit connected in a stage succeeding the first waveform reshaping circuit is delayed for a long period of time to lag behind the phase of a second filtered signal having the noise thereof removed by a noise removing circuit connected in a stage succeeding the second waveform reshaping circuit. Consequently, the sequence of the changes to logic levels occurring in the respective signals is reversed. Since the rotating direction of the rotor is decided based on the phase relationship between the first and second filtered signals, if the sequence of the changes of logical level is reversed, the rotating direction of the rotor may be incorrectly decided.

Thus, it is required to provide a signal processing circuit of a rotation detecting device capable of producing and outputting accurate rotational information that includes the rotating direction of a rotor which rotates along with the rotation of an object of detection.

Also known is, for example, a technology described in a patent document 3 that is JP-A-2007-170922 corresponding to US Patent Application Publication No. 2007/0139036. According to generally known technologies including the technology described in the literature, a signal processing circuit of a rotation detecting device includes: first and second magnetic sensors that are disposed to be opposed to, for example, the periphery of a crank rotor (rotor) which rotates along with the rotation of a crankshaft (object of detection) of an onboard engine, and that output rotational signals dependent on the rotation of the crank rotor; first and second waveform reshaping units that fetch first and second rotational signals outputted from the first and second magnetic sensors, reshape the waveforms of the first and second rotational signals, and output first and second pulsating signals which have a phase difference; and a reverse rotation deciding unit that fetches the first and second pulsating signals outputted from the first and second waveform reshaping units, and decides reversal of the rotating direction of the crank rotor on the basis of the relationship between the phases of the first and second pulsating signals. Moreover, the signal processing circuit of a rotation detecting device includes: a mask unit that masks one pulse part of the first pulsating signal which ranges from the first rise of the first pulsating signal to the first fall thereof and which occurs immediately after the reversal of the rotating direction of the crank rotor is decided by the reversal rotation deciding unit, and produces and outputs a masked signal which is a signal having the logical level of the masked first pulsating signal reversed; a rotating direction deciding unit that decides the rotating direction of the crank rotor on the basis of the relationship between the phases of the first and second pulsating signals outputted from the first and second waveform reshaping units; and an output unit that outputs the masked signal, which is fetched from the mask unit, as an output signal within a signal level band which differs from one to another according to the result of the decision concerning the rotating direction of the crank rotor performed by the rotating direction deciding unit. Consequently, rotational information including the result of the decision concerning the rotating direction of the crank rotor is produced, and the output signal is outputted to, for example, an ECU for vehicle control which is connected in a stage succeeding the signal processing circuit of a rotation detecting device.

If the technology described in the patent document 1 is applied as it is to, for example, a crank rotor that rotates along with the rotation of a crankshaft, problems described below arise. Specifically, for example, when a vehicle in which the signal processing circuit of a rotation detecting device is mounted is stopped, the rotation of the crankshaft is ceased. Consequently, the rotation of the crank rotor is ceased. Therefore, an output signal of the signal processing circuit of a rotation detecting device cannot have the waveform changed. However, a microscopic vibration may occur in the crank rotor due mainly to a backlash between the crankshaft and crank rotor and a vibration of the vehicle. When the microscopic vibration occurs in the crank rotor, although the crank rotor is substantially stopped, the rotating direction deciding unit included in the signal processing circuit of a rotation detecting device may incorrectly decide that the rotating direction of the crank rotor is switched to the direction of normal rotation or the direction of reverse rotation for a short period of time. In the technology described in the patent document 1, the result of the decision performed on the rotating direction of the rotor by the rotating direction deciding unit is used to immediately change the combination of kinds of signals to be outputted to the first and second output terminals. There is a fear that an ECU for vehicle control connected in a succeeding stage cannot appropriately execute various vehicle controls.

In the general technologies including the technology described in the patent document 3, an output signal is not produced by utilizing the first pulsating signal as it is, but the output signal is produced by utilizing a masked signal having one pulse part of the first pulsating signal, which ranges from the first rise thereof to the first fall thereof and occurs immediately after the reversal of the rotating direction of the crank rotor is decided. The output signal is immediately outputted to the ECU for vehicle control connected in the succeeding stage. Consequently, if a vehicle vibrates, the number of pulses contained in the output signal would decrease. Therefore, the ECU for vehicle control connected in the succeeding stage can decide that the rotating speed of the crank rotor is nearly null. In other words, it is possible to decide that the vehicle is substantially stopped. However, although the crank rotor itself is substantially stopped, it is still decided that the rotating direction of the crank rotor is frequently switched to the direction of normal rotation or the direction of reverse direction for a short period of time. Based on the result of the decision, the output signal is produced within a different signal level band, and outputted to the ECU for vehicle control connected in the succeeding stage. Consequently, the fear that the ECU for vehicle control connected in the succeeding stage may not be able to appropriately execute various vehicle controls cannot be swept aside.

Thus, it is required to provide a signal processing circuit of a rotation detecting device capable of producing and outputting accurate rotational information including the substantial rotating direction of an object of detection.

SUMMARY OF THE INVENTION

In view of the above-described problem, it is an object of the present disclosure to provide a signal processing circuit for a rotation detector. It is another object of the present disclosure to provide a method for detecting rotation of an object.

According to a first aspect of the present disclosure, a signal processing circuit for a rotation detector for detecting rotation of an object includes: first and second sensor elements for outputting first and second rotation signals, respectively, wherein the first and second rotation signals have individual phases for representing rotation of a rotor that rotates together with the object; first and second waveform reshaping elements for reshaping the first and second rotation signals into first and second pulse signals having first and second pulse signal levels, respectively; and first and second filters for outputting first and second filter signals having first and second filter signal levels, respectively, wherein, when a period in which one of the first and second pulse signal levels is constant is equal to or longer than a predetermined period, a corresponding filter outputs a corresponding filter signal with a corresponding filter signal level after the predetermined period elapses, the corresponding filter signal level being equal to the filter signal level in the period, and wherein, when one of the first and second pulse signal levels is changed within the predetermined period, a corresponding filter sets a corresponding one of first and second logic retaining periods in a corresponding filter signal, wherein a corresponding filter signal level is maintained to a previous value during the corresponding one of the first and second logic retaining periods, wherein the previous value is the filter signal level before the change, and wherein the corresponding one of the first and second logic retaining periods is set after the change until the predetermined period elapses; a phase difference compensation deciding element for deciding whether one of the first and second logic retaining periods set in a leading one of the first and second filter signals is longer than the other one of the first and second logic retaining periods set in a following one of the first and second filter signals, wherein a noise occurs within the predetermined period so that the leading one precedes the following one; a phase difference compensation executing element for outputting first and second phase difference compensation output signals corresponding to the first and second filter signals, respectively, wherein, when the phase difference compensation deciding element determines that the one set in the leading one is longer than the other one set in the following one, the phase difference compensation executing element prolongs the other one set in the following one to be equal to or longer than the one set in the leading one so that a phase relationship between the first and second filter signals after decision of the phase difference compensation deciding element is equal to a phase relationship between the first and second filter signals just before the decision of the phase difference compensation deciding element, and the phase difference compensation executing element outputs the first and second filter signals as the first and second phase difference compensation output signals, respectively, and wherein, when the phase difference compensation deciding element determines that the one set in the leading one is not longer than the other one set in the following one, the phase difference compensation executing element directly outputs the first and second filter signals as the first and second phase difference compensation output signals, respectively; a rotation direction deciding element for repeatedly deciding based on the phase relationship between the first and second phase difference compensation output signals whether a rotation direction of the rotor is a first direction or a second direction, which is opposite to the first direction; and an output element for outputting an output signal, which relates to rotation information that includes decision of the rotation direction of the rotor.

Since the rotation direction deciding element decides the rotation direction of the rotor on the basis of the phase relationship between the first and second phase difference compensation output signals which have the phase difference thereof forcibly compensated, accurate rotation information including the rotating direction of the rotor that rotates along with the object can be produced and outputted.

According to a second aspect of the present disclosure, a signal processing circuit for a rotation detector for detecting rotation of an object includes: first and second sensor elements for outputting first and second rotation signals, respectively, wherein the first and second rotation signals have individual phases for representing rotation of a rotor that rotates together with the object; first and second waveform reshaping elements for reshaping the first and second rotation signals into first and second pulse signals having first and second pulse signal levels, respectively; first and second filters for outputting first and second filter signals having first and second filter signal levels, respectively, wherein, when a period in which one of the first and second pulse signal levels is constant is equal to or longer than a predetermined period, a corresponding filter outputs a corresponding filter signal with a corresponding filter signal level after the predetermined period elapses, the corresponding filter signal level being equal to the filter signal level in the period, and wherein, when one of the first and second pulse signal levels is changed within the predetermined period, a corresponding filter sets a corresponding one of first and second logic retaining periods in a corresponding filter signal, wherein a corresponding filter signal level is maintained to a previous value during the corresponding one of the first and second logic retaining periods, wherein the previous value is the filter signal level before the change, and wherein the corresponding one of the first and second logic retaining periods is set after the change until the predetermined period elapses; a phase difference compensation deciding element for deciding whether an end of one of the first and second logic retaining periods set in a leading one of the first and second filter signals is later than an end of the other one of the first and second logic retaining periods set in a following one of the first and second filter signals, wherein a noise occurs within the predetermined period so that the leading one precedes the following one; a phase difference compensation executing element for outputting first and second phase difference compensation output signals corresponding to the first and second filter signals, respectively, wherein, when the phase difference compensation deciding element determines that the end of the one set in the leading one is later than the end of the other one set in the following one, the phase difference compensation executing element postpones the end of the other one set in the following one to be equal to or later than the end of the one set in the leading one so that a phase relationship between the first and second filter signals after decision of the phase difference compensation deciding element is equal to a phase relationship between the first and second filter signals just before the decision of the phase difference compensation deciding element, and the phase difference compensation executing element outputs the first and second filter signals as the first and second phase difference compensation output signals, respectively, and wherein, when the phase difference compensation deciding element determines that the end of the one set in the leading one is not later than the end of the other one set in the following one, the phase difference compensation executing element directly outputs the first and second filter signals as the first and second phase difference compensation output signals, respectively; a rotation direction deciding element for repeatedly deciding based on the phase relationship between the first and second phase difference compensation output signals whether a rotation direction of the rotor is a first direction or a second direction, which is opposite to the first direction; and an output element for outputting an output signal, which relates to rotation information that includes decision of the rotation direction of the rotor.

In the above circuit, accurate rotational information including the rotating direction of the rotor that rotates along with the object can be produced and outputted.

According to a third aspect of the present disclosure, a signal processing circuit for a rotation detector for detecting rotation of an object includes: a plurality of sensor elements, each of which outputs a rotation signal having an individual phase for representing rotation of a rotor that rotates together with the object; a plurality of waveform reshaping elements, each of which reshapes a corresponding rotation signal into a pulse signal; a plurality of edge signal production elements, each of which detects at least one of an rising edge and a falling edge in a corresponding pulse signal, and outputs an edge signal corresponding to the at least one of the rising edge and the falling edge; a rotating direction decision element that repeatedly decides based on a plurality of edge signals at every first time interval whether a rotating direction of the rotor is a first direction or a second direction, and that holds a decision result of the rotating direction during the first time interval, wherein the second direction is opposite to the first direction; a reverse rotation decision element that repeatedly decides based on the plurality of edge signals at every second time interval whether the rotating direction of the rotor has been reversed; and an output element that outputs an output signal based on the decision result of the rotating direction and a plurality of pulse signals, wherein the output signal corresponds to rotation information including the rotating direction of the rotor. When the reverse rotation decision element decides that the rotating direction of the rotor has been reversed from the first direction to the second direction, the output element defines that the rotating direction is the first direction until the reverse rotation decision element decides successively predetermined times that the rotating direction has not been reversed after the reverse rotation decision element decides that the rotating direction has been reversed. When the reverse rotation decision element decides successively the predetermined times that the rotating direction has not been reversed after the reverse rotation decision element decides that the rotating direction has been reversed, the output element defines that the rotating direction is the second direction.

Consequently, according to the aforesaid construction as the signal processing circuit of a rotation detecting device, for example, when a backlash is present between an object of detection and a rotor and a vibration occurs in the object of detection, even if a microscopic vibration occurs in the rotor due to the backlash and the vibration of the object of detection, such an incident will not take place that: although the rotor is substantially stopped, an incorrect decision is made that the rotating direction of the rotor has been switched to a first direction or a second direction for a short period of time, and an output signal is produced or more particularly outputted based on the result of the incorrect decision. In short, even when the vibration occurring in the object of detection is conveyed to the rotor, the signal processing circuit of a rotation detecting device having the aforesaid configuration can produce and output accurate rotational information including the substantial rotating direction of the object of detection.

According to a fourth aspect of the present disclosure, a method for detecting rotation of an object includes: detecting rotation of a rotor, and outputting a plurality of rotation signals having individual phases, each of which represents the rotation of the rotor; reshaping the plurality of rotation signals, and outputting a plurality of pulse signals, each of which corresponds to a respective rotation signal; detecting at least one of an rising edge and a falling edge in each pulse signal, and outputting a plurality of edge signals, each of which corresponds to the at least one of the rising edge and the falling edge; repeatedly deciding based on the plurality of edge signals at every first time interval whether a rotating direction of the rotor is a first direction or a second direction, and holding a decision result of the rotating direction during the first time interval, wherein the second direction is opposite to the first direction; repeatedly deciding based on the plurality of edge signals at every second time interval whether the rotating direction of the rotor has been reversed; outputting an output signal based on the decision result of the rotating direction and the plurality of pulse signals, wherein the output signal corresponds to rotation information including the rotating direction of the rotor; defining that the rotating direction is the first direction until it is decided successively twice that the rotating direction has not been reversed after it is decided that the rotating direction of the rotor has been reversed from the first direction to the second direction; and defining that the rotating direction is the second direction when it is decided successively twice that the rotating direction has not been reversed after it is decided that the rotating direction has been reversed.

The above method can produce and output accurate rotational information including the substantial rotating direction of the object of detection.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

First Embodiment

A signal processing circuit of a rotation detecting device detects, for example, a crankshaft or a cam shaft of an onboard engine.

Figure 1:
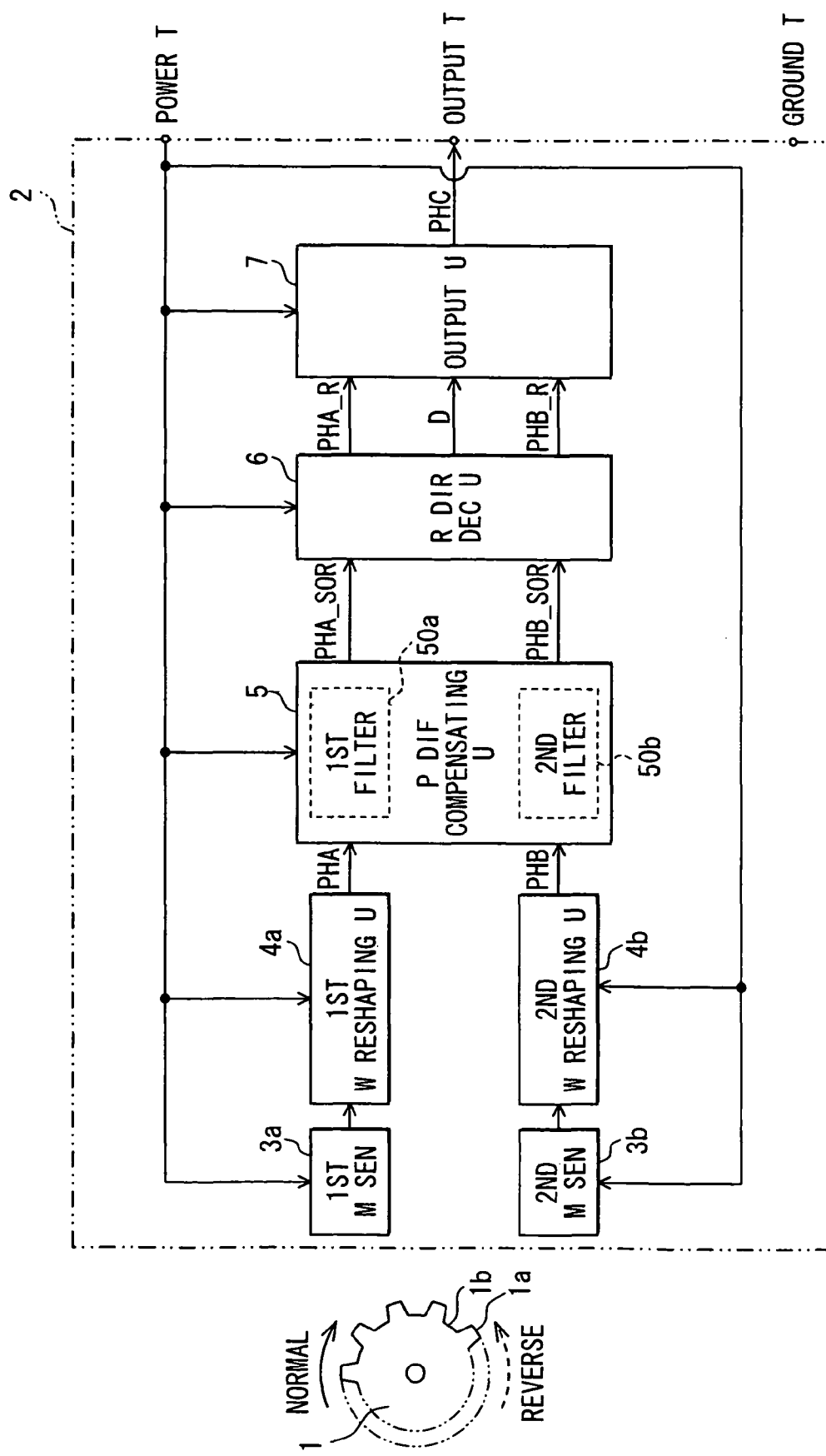
FIG. 1 is an illustrative diagram showing the overall configuration of a first embodiment of a signal processing circuit of a rotation detecting device.

Referring to FIG. 1 to FIG. 9, an embodiment of a signal processing circuit of a rotation detecting device will be described below. FIG. 1 is a block diagram showing the overall configuration of the embodiment. To begin with, referring to FIG. 1, the configuration of the signal processing circuit of a rotation detecting device in accordance with the embodiment (hereinafter may be simply called the signal processing circuit) will be described below.

The object of detection of the present embodiment is, for example, a crankshaft of an onboard engine (not shown). In reality, the present embodiment produces and outputs rotational information including the rotating direction of a crank rotor 1 that rotates along with the rotation of the crankshaft. Based on the rotational information of the crank rotor 1, the rotational information on the crankshaft, for example, the turning angle of the crankshaft, the number of rotations per a unit time, and the rotating direction are acquired by an appropriate processing circuit or an ECU that is not shown and that is connected in a succeeding stage. The crank rotor 1 is formed with, for example, a magnetic body, and has ridges 1a and valleys 1b formed alternately on the periphery thereof with a predetermined pitch between adjoining ones.

As shown in FIG. 1, a signal processing circuit 2 includes fundamentally first and second magnetic sensors (sensor elements) 3a and 3b, first and second waveform reshaping units 4a and 4b, a phase difference compensating unit 5 including first and second filter blocks (pieces of filter means), a rotating direction deciding unit (rotating direction deciding means) 6, and an output unit (output means) 7.

The first and second magnetic sensors 3a and 3b are formed with, for example, magnetoresistive elements (MREs), and are opposed to the periphery of the crank rotor 1 as described above. Moreover, the distance between the first and magnetic sensors 3a and 3b is set to a distance calculated by adding or subtracting a distance equivalent to a quarter of the pitch to or from a distance equivalent to an integral multiple of the pitch between the adjoining ridges 1a. The first and second magnetic sensors 3a and 3b output rotational signals, each of which is associated with the turning angle of the crank rotor 1, to the first and second waveform reshaping units 4a and 4b respectively connected in succeeding stages. More particularly, when any of the ridges 1a on the periphery of the crank rotor 1 is opposed to the first or second magnetic sensor, the magnetic sensor outputs a rotational signal of, for example, 5.0 V. When any of the valleys 1b of the crank rotor 1 is opposed to the first or second magnetic sensor, the magnetic sensor outputs a rotational signal of, for example, 0.0 V.

The first and second waveform reshaping units 4a and 4b reshape the waveforms of first and second rotational signals, which are fetched from the first and second magnetic sensors 3a and 3b, into the waveforms of first and second pulsating signals, and output the resultant signals as first and second pulsating signals PHA and PHB that have a phase difference of, for example, ¼ (see, for example, the graphs of waves PHA and PHB of FIG. 4 which will be referred to later). As shown in FIG. 1, the output terminals of the first and second waveform reshaping units 4a and 4b are connected to the input terminals of the phase difference compensating unit 5.

Figure 2:
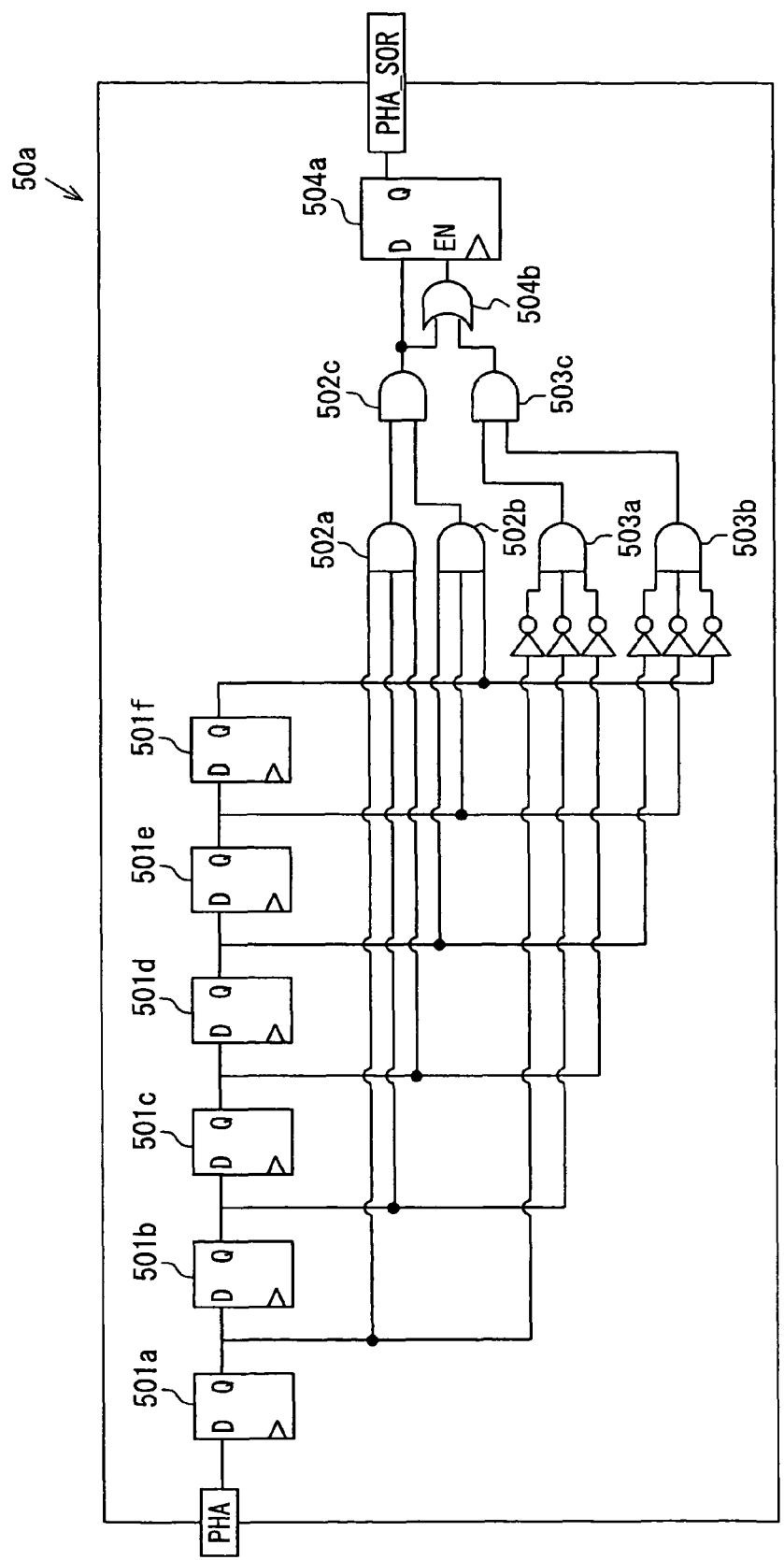
FIG. 2 is a circuit diagram showing an example of the circuitry of a first filter block included in the first embodiment.

The phase difference compensating unit 5 includes first and second filter blocks 50a and 50b, compensates the phase difference between first and second filtered output signals which are outputted from the first and second filter blocks 50a and 50b, and outputs the resultant signals as first and second phase difference-compensated output signals PHA_R and PHB_R to the rotating direction deciding unit 6 connected in a succeeding stage. Incidentally, the first and second filter blocks 50a and 50b have the same structure. For convenience' sake, therefore, the first filter block 50a will be mainly described and the description of the second filter block 50b will be omitted. FIG. 2 shows an example of the fcircuitry of the first filter block 50a. As shown in FIG. 2, the first filter block 50a fundamentally includes: delayers 501a to 501f that sequentially delay the first pulsating signal PHA by a certain time; AND circuits 502a to 502c that calculate the AND of output values of the delayers 501a to 501f; AND circuits 503a to 503c that calculate the AND of reverse output values of the delayers 501a to 501f; and a flip-flop 504a that inputs the output value of the AND circuit 502c through an input terminal D thereof, and inputs an output value of an OR circuit 504b, which calculates the OR of the output value of the AND circuit 502c and the output value of the AND circuit 53c, through an input terminal EN thereof. Incidentally, when the flip-flop 54a inputs a signal, of which signal level is associated with a logical high state, through the input terminal EN, the flip-flop 54a outputs a signal, which has a signal level identical to that of the signal applied to the input terminal D, through an output terminal Q thereof. When the flip-flop 504a inputs a signal, of which signal level is associated with a logical low state, through the input terminal EN, the flip-flop 504a holds the signal level of the signal inputted through the input terminal D, and outputs the signal through the output terminal Q thereof. Owing to the circuitry, when a period during which the signal level of the first pulsating signal PHA does not change extends over a predetermined period (in the present embodiment, a period that is six times longer than the above certain time), the first filter block 50a outputs a first filtered signal PHA_SOR at a signal level identical to the signal level, which is attained during the period during which the signal level does not change, after the elapse of the predetermined period. Moreover, when the change in the signal level of the first pulsating signal PHA occurs during a predetermined period T, the first filter block 50a outputs the first filtered signal PHA_SOR at the same signal level as the signal level, which is attained prior to the change, until the predetermined period T elapses after the last occurrence of the change. In other words, a logic retaining period is provided.

Figure 3:
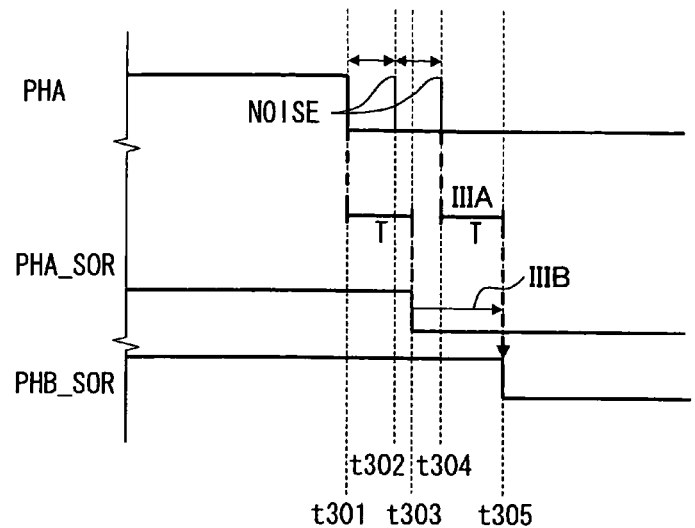
FIG. 3 is a timing chart including a graph of wave PHA that shows an example of the waveform of a first pulsating signal PHA, a graph of wave PHA_SOR that shows an example of the waveform of a first filtered signal PHA_SOR obtained when the adverse effect of noise is not manifested in the first pulsating signal, a graph of wave PHA_SOR that shows an example of the waveform of the first filtered signal PHA_SOR obtained when the adverse effect of noise is manifested in the first pulsating signal.

An example of operations performed in the first filter block 50a is indicated by the timing chart of FIG. 3. Here, IIIA represents that if a period during which signal level of pulsating signal does not change extends over a predetermined period T, a filtered signal is outputted at the same signal level. IIIB represents that after a pulsating signal has a signal level thereof changed, if one or more noises are successively mixed in a pulsating signal at intervals of time shorter than a predetermined period T, change in a signal level of a filtered signal is delayed. Assume that the first pulsating signal PHA having the waveform shown in the graph of wave PHA of FIG. 3 is inputted from the first waveform reshaping unit 4a to the phase difference compensating unit 5 (more particularly, the first filter block 50a). Specifically, the first pulsating signal PHA having a signal level associated with a logical high state shall have the signal level thereof changed to a signal level associated with a logical low state at, for example, a time instant t301. At this time, normally, the first filtered signal PHA_SOR has, as shown in the first graph of wave PHA_SOR of FIG. 3, the signal level thereof changed from the signal level associated with the logical high state to the signal level associated with the logical low state at a time instant t303 that comes in the predetermined period T after the time instant t301. On the other hand, as shown in, for example, the graph of wave PHA of FIG. 3, noise shall be superposed on the first rotational signal at, for example, a time instant t302 at which the predetermined period T has not elapsed since the time instant t301 at which the first pulsating signal PHA falls from the signal level associated with the logical high state to the signal level associated with the logical low state, and at, for example, a time instant t304 at which the predetermined period T has not elapsed since the time instant t302. The adverse effect of the noise shall be manifested in the first pulsating signal PHA. In this case, as shown in the second graph of wave PHA_SOR of FIG. 3, the first filtered signal PHA_SOR falls from the signal level associated with the logical high state to the signal level associated with the logical low state at a time instant t305 that comes in the predetermined period T after the time instant t304 at which the adverse effect of the noise is manifested in the first pulsating signal PHA. Thus, as long as the adverse effect of the noise superposed on the first rotational signal is not manifested in the first pulsating signal PHA, the first logic retaining period during which the signal level of the first pulsating signal PHA is retained extends from the time instant t301 to the time instant t303. In contrast, when the adverse effect of the noise superposed on the first rotational signal is manifested in the first pulsating signal PHA, the first logic retaining period during which the signal level of the first pulsating signal PHA is retained extends from the time instant t301 to the time instant t305, that is, the first logic retaining period is prolonged.

As shown in FIG. 1, the rotating direction deciding unit 6 is formed mainly with a circuit including numerous D flip-flops that are not shown, or a microcomputer or the like. The rotating direction deciding unit 6 has the input terminal thereof connected to the output terminal of the phase difference compensating unit 5, and fetches first and second phase difference-compensated output signals PHA_R and PHB_R. Based on the phase relationship between the first and second phase difference-compensated output signals PHA_R and PHB_R, or in other words, for example, based on whether the first phase difference-compensated output signal PHA_R leads the second phase difference-compensated output signal PHB_R or the second phase difference-compensated output signal PHB_R leads the first phase difference-compensated output signal PHA_R, the rotating direction deciding unit 6 repeatedly decides whether the rotating direction of the crank rotor 1 is the direction of normal rotation or the direction of reverse rotation opposite to the direction of normal rotation. In the present embodiment, the normal rotation and reverse rotation to be decided by the rotating direction deciding unit 6 shall be, for example, clockwise rotation in FIG. 1 and counterclockwise rotation therein respectively. The rotating direction deciding unit 6 has the output terminal thereof connected to the input terminal of the output unit 7, and outputs a signal D, which represents the result of the decision concerning the rotating direction, to the input terminal of the output unit 7. A concrete method of deciding the rotating direction of the crank rotor 1 will be described later with reference to FIG. 8.

The output unit 7 is, as shown in FIG. 1, formed with, for example, a microcomputer or the like. The output unit 7 has the input terminal thereof connected to the output terminal of the rotating direction deciding unit 6, and fetches the signal D, which represents the result of the decision concerning the rotating direction of the crank rotor 1 as well as the first and second phase difference-compensated output signals PHA_R and PHB_R. The output unit 7 has the output terminal thereof connected to the output terminal of the signal processing circuit 2, and outputs a third pulsating signal PHC to the output terminal of the signal processing circuit 2. The third pulsating signal PHC to be produced and outputted by the output unit 7 will be described later with reference to FIG. 9.

Moreover, the components of the signal processing circuit 2 are, as shown in FIG. 1, connected to a power feed terminal and a ground terminal. The components of the signal processing circuit 2 are connected to the power feed terminal, and the terminal of an external power supply such as a battery that is not shown and is disposed outside the signal processing circuit 2 is connected to the power feed terminal. Power is fed from the external power supply to the components.

Assuming that noise is simultaneously superposed on both the first and second rotational signals and the adverse effect of the noise is manifested in both the first and second pulsating signals PHA and PHB, as long as the foregoing first and second filter blocks 50a and 50b are employed, the adverse effect of the noise on the decision to be performed on the rotating direction of the crank rotor 1 by the rotating direction deciding unit 6 can be minimized. However, although the noise is simultaneously superposed on both the first and second rotating signals, if the adverse effect of the noise is manifested in only one of the first and second pulsating signals PHA and PHB, an incident described below may take place.

Figure 4:
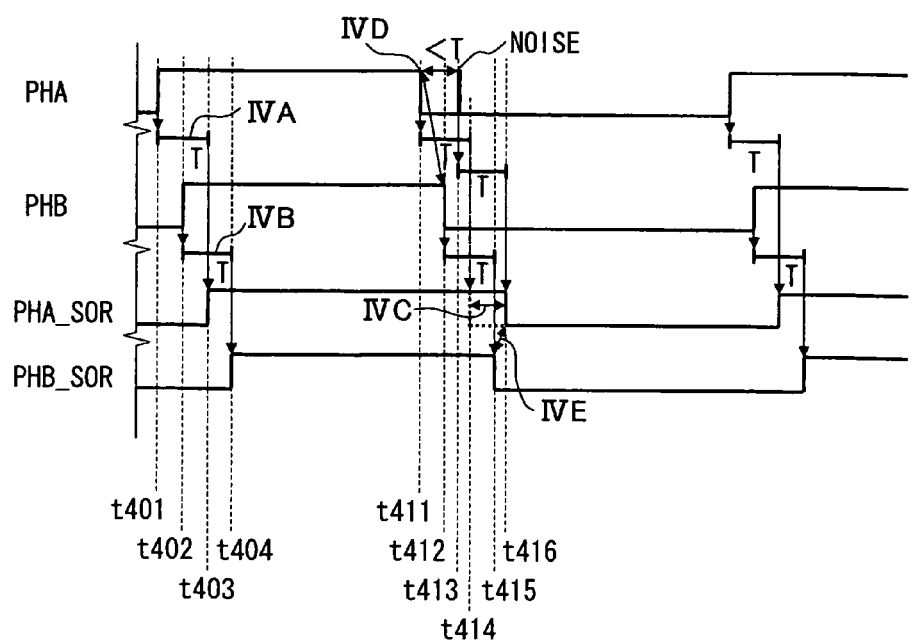
FIG. 4 is a timing chart including graphs of waves PHA and PHB that show examples of the waveforms of first and second pulsating signals PHA and PHB, and graphs of waves PHA_SOR and PHB_SOR that show examples of the waveforms of first and second filtered signals PHA_SOR and PHB_SOR.

FIG. 4 is a timing chart indicating another example of operations to be performed by the first and second filter blocks 50a and 50b. Here, IVA represents a logic retaining period for a signal PHA, and IVB represents a logic retaining period for a signal PHB. IVC represents that a signal lags because of a noise. IVD represents that a phase of PHA is ahead of the phase of PHB. IVD represents that PHA lags behind PHB. Here, a phase relationship is opposite to a phase relationship between input signals. This leads to incorrect detection of rotation. The first pulsating signal PHA shall rise, as shown in the graph of wave PHA of FIG. 4, from the signal level associated with the logical low state to the signal level associated with the logical high state at, for example, a time instant t401, and shall fall from the signal level associated with the logical high state to the signal level associated with the logical low state at a time instant t411. Moreover, the second pulsating signal PHB rises, as shown in the graph of wave PHB of FIG. 4, from the signal level associated with the logical low state to the signal level associated with the logical high state at, for example, a time instant t402, and falls from the signal level associated with the logical high state to the signal level associated with the logical low state at a time instant t412. In this case, as shown in the graph of wave PHA_SOR of FIG. 4, the first filtered signal PHA_SOR rises from the signal level associated with the logical low state to the signal level associated with the logical high state at, for example, a time instant t403 that comes in the predetermined period T after the time instant t401. On the other hand, as shown in the graph of wave PHB_SOR of FIG. 4, the second filtered signal PHB_SOR rises from the signal level associated with the logical low state to the signal level associated with the logical high state at, for example, a time instant t404 that comes in the predetermined period T after the time instant t402. Herein, the phase relationship between the first and second filtered signals PHA_SOR and PHB_SOR is identical to the phase relationship between the first and second pulsating signals PHA and PHB. In other words, as the first pulsating signal PHA leads the second pulsating signal PHB, so the first filtered signal PHA_SOR leads the second filtered signal PHB_SOR. The phase relationships are sustained.

However, assume that, as shown in the graphs of waves PHA and PHB, at, for example, a time instant t413 at which the predetermined period T has not elapsed since the time instant t411, noise is superposed on both the first and second rotational signals, and the adverse effect of the superposed noise is manifested in only the first pulsating signal PHA. In this case, as shown in the graphs of waves PHA_SOR and PHB_SOR, the first filtered signal PHA_SOR falls from the signal level associated with the logical high state to the signal level associated with the logical low state at, for example, a time instant t416 that comes in the predetermined period T after the time instant t413. On the other hand, the second filtered signal PHB_SOR falls from the signal level associated with the logical high state to the signal level associated with the logical low state at a time instant t415 that comes earlier than the time instant t416. Consequently, the phase relationship between the first and second filtered signals PHA_SOR and PHB_SOR differs from the phase relationship between the first and second pulsating signals PHA and PHB, or in other words, is opposite to the phase relationship between the first and second pulsating signals PHA and PHB.

As mentioned above, although the first and second filter blocks 50*a* and 50*b* are employed, the adverse effect of noise, which is superposed on the first and second rotational signals, on the result of decision concerning the rotating direction of the crank rotor 1 cannot be minimized. The rotating direction of the crank rotor i may be incorrectly decided.

Figure 5:
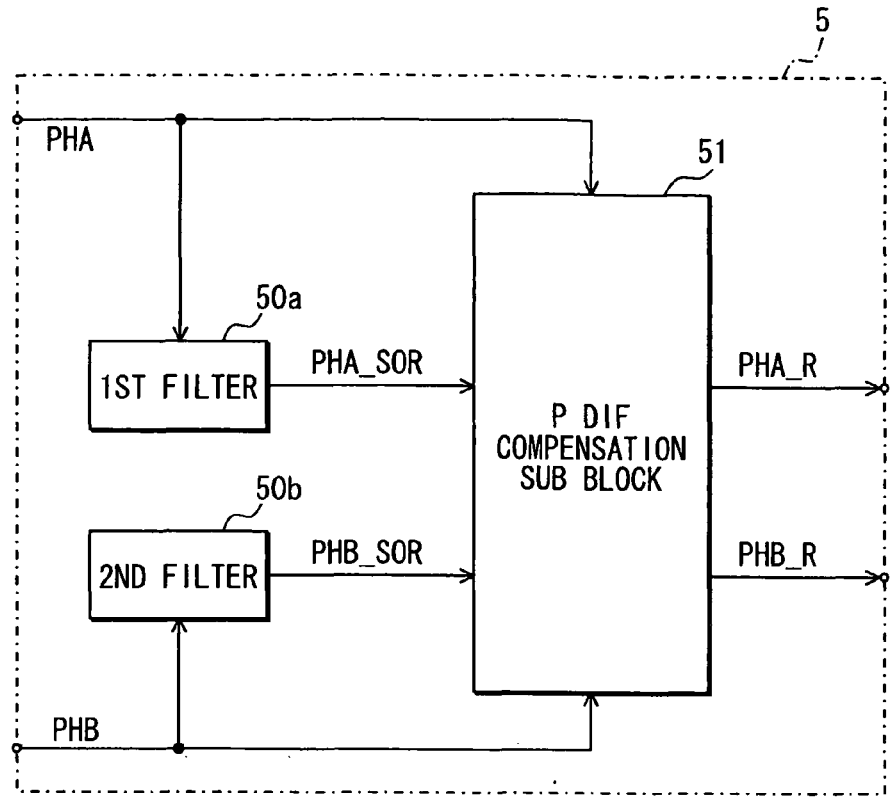
FIG. 5 is a block diagram showing an example of the configuration of a phase difference compensating unit included in the first embodiment.

In the present embodiment, the phase difference compensating unit 5 includes, as shown in FIG. 5, in addition to the first and second filter blocks 50*a* and 50*b*, a phase difference compensation substantiating block (phase difference compensation deciding means and phase difference compensation executing means) 51 that decides whether a predetermined phase difference compensation executing condition is established, and that when the phase difference compensating condition, that is, the phase difference compensation executing condition is established, compensates the phase difference between the first and second filtered output signals PHA_SOR and PHB_SOR.

Referring to FIG. 5, the phase difference compensation substantiating block 51 as well as the first and second filter blocks 50*a* and 50*b* will be described below. The phase difference compensation substantiating block 51 is basically a circuit having numerous circuit elements such as a delayer, a flip-flop, an AND circuit, an OR circuit, and an exclusive OR circuit combined. Herein, for convenience' sake, the phase difference compensation substantiating block and first and second filtered blocks are shown in the block diagram and will be described from a functional viewpoint.

As shown in FIG. 5, the input terminal of the phase difference compensation substantiating block 51 is connected to the output terminals of the first and second waveform reshaping units 4*a* and 4*b* (not shown in FIG. 5), and is also connected to the output terminals of the first and second filter blocks 50*a* and 50*b*. The phase difference compensation substantiating block 51 inputs the first and second pulsating signals PHA and PHB and the first and second filtered signals PHA_SOR and PHB_SOR. Based on the first and second pulsating signals PHA and PHB and the first and second filtered signals PHA_SOR and PHB_SOR, the phase difference compensation substantiating block 51 executes phase difference compensation deciding processing of deciding whether a predetermined phase difference compensation executing condition is established. Moreover, the phase difference compensation substantiating block 51 executes phase difference compensation executing processing on the basis of the first and second pulsating signals PHA and PHB, the first and second filtered signals PHA_SOR and PHB_SOR, and the result of decision performed in the phase difference compensation deciding processing. The phase difference compensation substantiating block 51 then outputs the first and second phase difference-compensated output signals PHA_R and PHB_R that have been subjected to the phase difference compensating processing.

Now, the phase difference compensating condition will be described below. As shown in FIG. 4 and as already mentioned above, in the situation in which noise is simultaneously superposed on both the first and second rotational signals and the adverse effect of the superposed noise is manifested in only the first pulsating signal PHA, the first logic retaining period that is the logic retaining period for the first pulsating signal PHA (ranging from the time instant t411 to time instant t416 in FIG. 4 indicating the example of operations), and the second logic retaining period that is the logic retaining period for the second pulsating signal PHB (ranging from the time instant t412 to time instant t415 in FIG. 4 indicating the example of operations) are different in length from each other. Moreover, the change in the signal level of the second pulsating signal PHB, which is provided with a shorter logic retaining period, from the signal level associated with the logical high state to the signal level associated with the logical low state (which occurs at the time instant t412 in FIG. 4 indicating an example of operations) occurs within the longer logic retaining period for the first pulsating signal PHA. In other words, the end (at the time instant t416 in this case) of the logic retaining period provided for the leading one of the first and second filtered signals PHA_SOR and PHB_SOR (first filtered signal PHA_SOR in this case), that is, the end of one of the first and second logic retaining periods provided by the first and second filter blocks 50a and 50b comes later than the end (at the time instant t415 in this case) of the logic retaining period provided for the lagging filtered signal (second filtered signal PHB_SOR in this case). Consequently, as a condition under which the foregoing situation takes place, that is, as a condition under which compensation of a phase difference should be executed, the present embodiment adopts such conditions that the lengths of the logic retaining period for the first pulsating signal PHA and the logic retaining period for the second pulsating signal PHB are different from each other and that the change in the signal level of the pulsating signal provided with the shorter logic retaining period occurs within the longer logic retaining period.

Next, the phase difference compensating processing will be described below. As shown in FIG. 4 and as mentioned above, in the situation in which noise is simultaneously superposed on both the first and second rotational signals and the adverse effect of the superposed noise is manifested in only the first pulsating signal PHA, the phase relationship between the first and second filtered signals PHA_SOR and PHB_SOR (signifying that the second filtered signal PHB_SOR leads the first filtered signal PHA_SOR during a period from the time instant t412 to the time instant t416 in FIG. 4) is different from the phase relationship between the first and second pulsating signals PHA and PHB (signifying that the first pulsating signal PHA leads the second pulsating signal PHB during a period from the time instant t411 to the time instant t413 in FIG. 4), or in other words, is opposite to the phase relationship between the first and second pulsating signals PHA and PHB.

However, immediately before the phase difference compensating condition is established (at the time instant t416 in FIG. 4), the phase relationship between the first and second filtered signals PHA_SOR and PHB_SOR (signifying that the first filtered signal PHA_SOR leads the second filtered signal PHB_SOR during a period from the time instant t403 to the time instant t404 in FIG. 4) is identical to the phase relationship between the first and second pulsating signals PHA and PHB (signifying that the first pulsating signal PHA leads the second pulsating signal PHB during a period from the time instant t401 to the time instant t402 in FIG. 2). Consequently, in the present embodiment, when the longer one of the first and second logic retaining periods comes to an end, the phase difference compensation substantiating block 51 forcibly corrects the phase relationship between the first and second phase difference-compensated output signals PHA_R and PHB_R so that the phase relationship will be identical to the phase relationship between the first and second phase difference-compensated output signals PHA_R and PHB_R attained immediately before the phase difference compensating condition is established. In other words, the phase difference compensation substantiating block 51 forces the end of the logic retaining period provided for the lagging filtered signal to come later than the end of the logic retaining period provided for the leading filtered signal so that the first and second filtered signals PHA_SOR and PHB_SOR will have the phase relationship identical to the phase relationship between them attained immediately before phase difference compensation deciding is performed, and outputs the first and second filtered signals as the first and second phase difference-compensated output signals.

Figure 6:
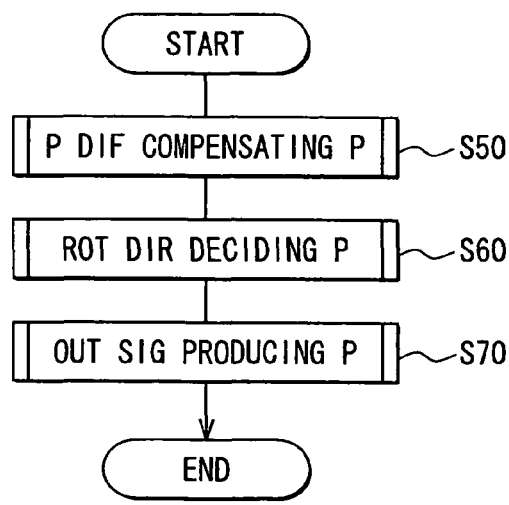
FIG. 6 is a flowchart presenting an example of a procedure of pieces of processing to be executed by a signal processing circuit of the first embodiment.
Figure 7:
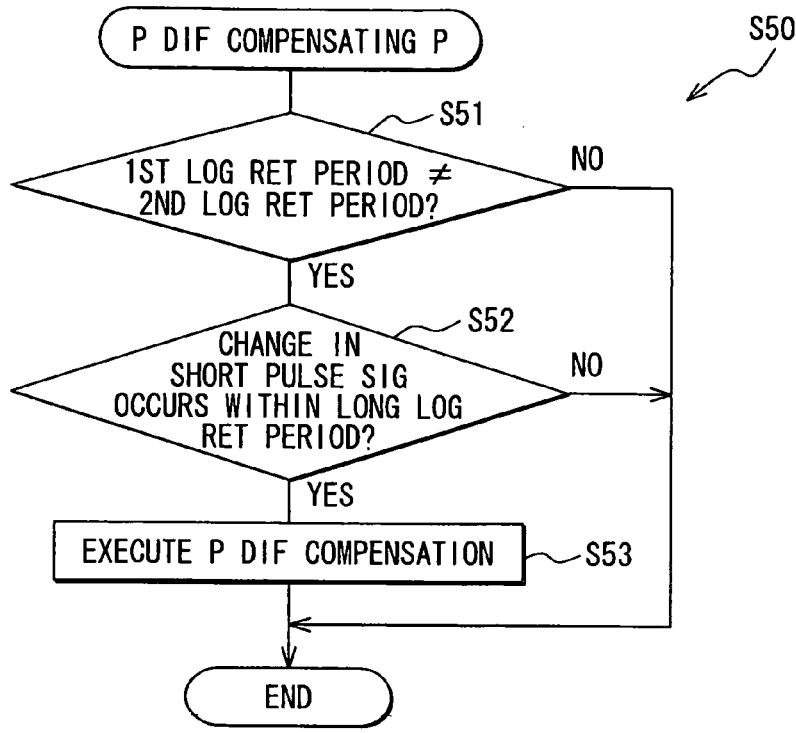
FIG. 7 is a flowchart presenting an example of a procedure of phase difference compensating processing to be executed by the phase difference compensating unit included in the first embodiment.
Figure 8:
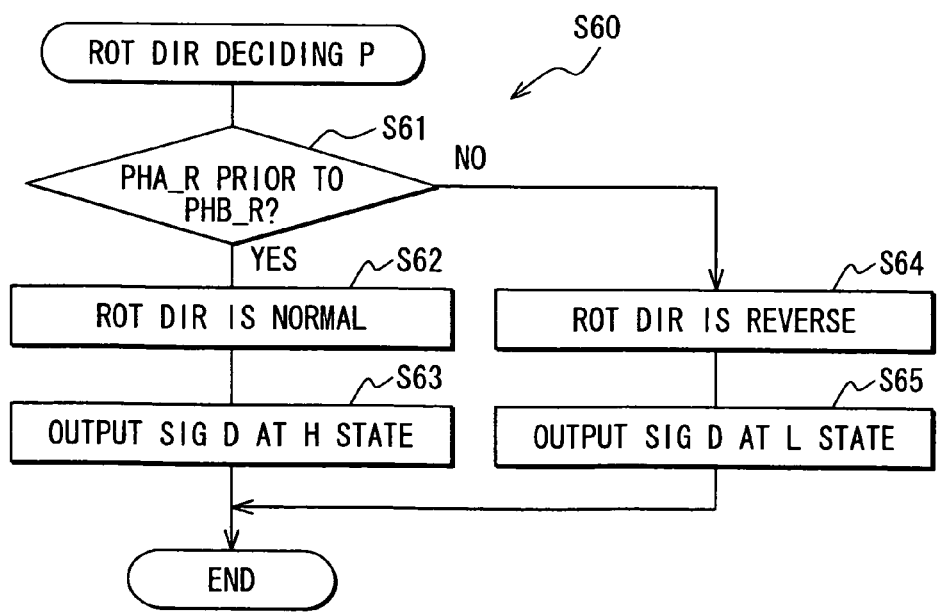
FIG. 8 is a flowchart presenting an example of a procedure of rotating direction deciding processing to be executed by a rotating direction deciding unit included in the first embodiment.
Figure 9:
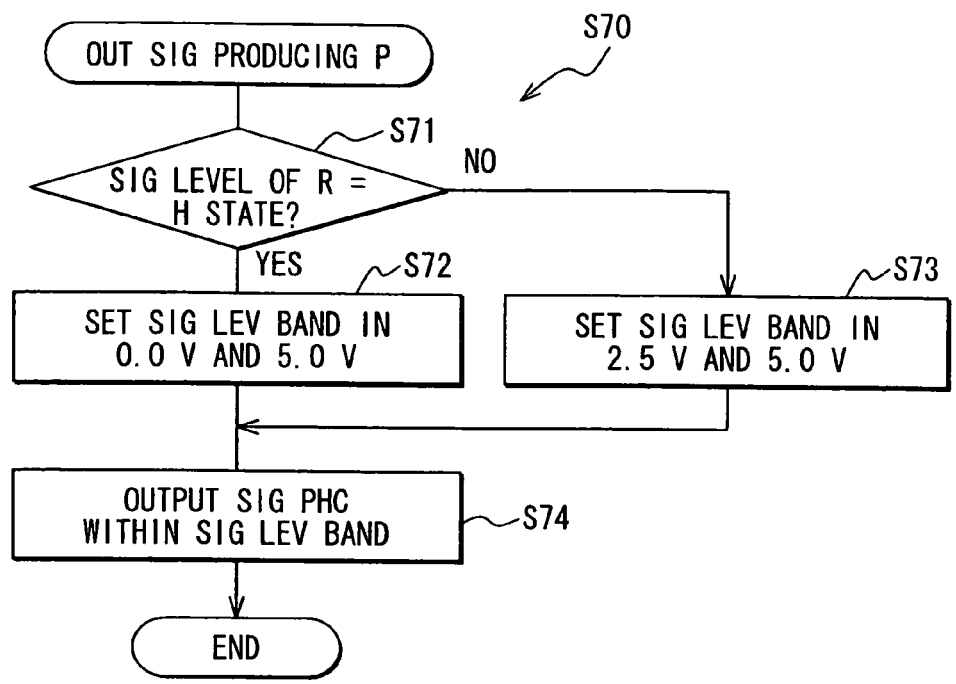
FIG. 9 is a flowchart presenting an example of a procedure of output signal producing processing to be executed by an output unit included in the first embodiment.

Operations to be performed by the components of the signal processing circuit 2 that is constructed as mentioned above will be described with reference to FIG. 6 to FIG. 9. FIG. 6 is a flowchart presenting a procedure to be executed by the signal processing circuit of the present embodiment. FIG. 7 is a flowchart presenting a procedure of phase difference compensating processing to be executed by the phase difference compensating unit included in the present embodiment. FIG. 8 is a flowchart presenting a procedure of rotating direction deciding processing to be executed by the rotating direction deciding unit included in the present embodiment. FIG. 9 is a flowchart presenting a procedure of output signal producing processing to be executed by the output unit included in the present embodiment.

To begin with, as shown in FIG. 6, when power is fed from the external power supply to the components of the signal processing circuit 2 via the power feed terminal, the phase difference compensating unit 5 executes phase difference compensating processing, which will be described later with reference to FIG. 7, as the processing of step S50. After the phase difference compensating processing is executed, the rotating direction deciding unit 6 executes rotating direction deciding processing, which will be described later with reference to FIG. 8, as the processing of step S60. After the rotating direction deciding processing is executed, the output unit 7 executes output signal producing/outputting processing, which will be described later with reference to FIG. 9, as the processing of step S70. The processing circuit 2 repeatedly executes the series of pieces of processing of steps S50 to S70.

The phase difference compensating unit 5 (more particularly, the phase difference compensation substantiating block 51) decides, as mentioned in FIG. 7, as deciding processing of step S51, whether the lengths of the first and second logic retaining periods are different from each other. Specifically, the phase difference compensation substantiating block 51 calculates the first logic retaining period on the basis of the first pulsating signal PHA and first filtered signal PHA_SOR, and calculates the second logic retaining period on the basis of the second pulsating signal PHB and second filtered signal PHB_SOR. The phase difference compensation substantiating block 51 then decides whether the lengths of the calculated first and second logic retaining periods are different from each other.

If the phase difference compensation substantiating block 51 concludes the deciding processing of step S51 in the affirmative or with Yes, the phase difference compensation substantiating block 51 decides, as deciding processing of step S52, whether the change in the signal level of the pulsating signal provided with the shorter logic retaining period has occurred within the longer logic retaining period. Specifically, if the phase difference compensation substantiating block 51 decides during the deciding processing of the previous step S51 that, for example, the first logic retaining period is longer than the second logic retaining period, the phase difference compensation substantiating block 51 decides, as deciding processing of step S52, whether the change in the signal level of the second pulsating signal PHB has occurred within the first logic retaining period. Otherwise, if the phase difference compensation substantiating block 51 decides during the deciding processing of step S51 that, for example, the second logic retaining period is longer than the first logic retaining period, the phase difference compensation substantiating block 51 decides, as the deciding processing of step S52, whether the change in the signal level of the first pulsating signal PHA has occurred within the second logic retaining period.

If the phase difference compensation substantiating block 51 concludes the deciding processing of step S52 in the affirmative or with Yes, the phase difference compensation substantiating block 51 executes phase difference compensation as the processing of step S53. Specifically, if the phase difference compensation substantiating block 51 decides through the pieces of deciding processing of steps S51 and S52 that the first logic retaining period is longer than the second logic retaining period and the change in the signal level of the second pulsating signal PHB has occurred within the first logic retaining period, the phase difference compensation substantiating block 51 forcibly compensates the phase difference so that the first phase difference-compensated output signal PHA_R will lead the second phase difference-compensated output signal PHB_R. More particularly, the phase difference compensation substantiating block 51 forcibly compensates the phase difference by prolonging the second logic retaining period until a period equivalent to, for example, one-third of the predetermined period T elapses after the end of the first logic retaining period. Otherwise, if the phase difference compensation substantiating block 51 decides through the pieces of deciding processing of steps S51 and S52 that the second logic retaining period is longer than the first logic retaining period and the change in the signal level of the first pulsating signal PHA has occurred within the second logic retaining period, the phase difference compensation substantiating block 51 forcibly compensates the phase difference so that the second phase difference-compensated output signal PHB_R will lead the first phase difference-compensated output signal PHA_R at the time of the end of the second logic retaining period. More particularly, the phase difference compensation substantiating block 51 forcibly compensates the phase difference by prolonging the first logic retaining period until the period equivalent to one-third of the predetermined period T elapses after the end of the second logic retaining period.

On the other hand, if the phase difference compensation substantiating block 51 concludes the deciding processing of step S51 in the negative or with No or concludes the deciding processing of step S52 in the negative or with No, the phase difference compensation substantiating block 51 outputs the first and second filtered signals PHA_SOR and PHB_SOR as the first and second phase difference-compensated output signals PHA_R and PHB_R to the rotating direction deciding unit 6, which is connected in the succeeding stage, without any change.

As mentioned above, when the phase difference compensating processing by the phase difference compensating unit 5 is completed, the rotating direction deciding unit 6 executes rotating direction deciding processing mentioned in FIG. 8. Specifically, the rotating direction deciding unit 6 decides, as deciding processing of step S61, whether the first filtered output signal PHA_R leads (i.e., is prior to) the second filtered output signal PHB_R. More particularly, for example, when the rotating direction deciding unit 6 detects a leading edge of the first phase difference-compensated output signal PHA_R, the rotating direction deciding unit 6 decides whether the signal level of the second phase difference-compensated output signal PHB_R corresponds to the signal level associated with the logical high state or the signal level associated with the logical low state.

When the leading edge of the first phase difference-compensated output signal PHA_R is detected, if the signal level of the second phase difference-compensated output signal PHB_R corresponds to the signal level associated with the logical high state, the first phase difference-compensated output signal PHA_R leads the second phase difference-compensated output signal PHB_R. Consequently, the rotating direction deciding unit 6 concludes the deciding processing of step S61 in the affirmative or with Yes. When the signal level of the second phase difference-compensated output signal PHB_R corresponds to the signal level associated with the logical low state, the second phase difference-compensated output signal PHB_R leads the first phase difference-compensated output signal PHA_R. Consequently, the rotating direction deciding unit 6 concludes the deciding processing of step S61 in the negative or with No.

If the rotating direction deciding unit 6 concludes step S61 in the affirmative or with Yes, the rotating direction deciding unit 6 decides, as processing of step S62, that the rotating direction of the crank rotor 1 is the direction of normal rotation, and outputs, as processing of step S63, a signal D to the output unit 7 at the signal level associated with the logical high state. On the other hand, if the rotating direction deciding unit 6 concludes step S61 in the negative or with No, the rotating direction deciding unit 6 decides, as processing of step S64, that the rotating direction of the crank rotor 1 is the direction of reverse rotation, and outputs, as processing of step S65, the signal D to the output unit 7 at the signal level associated with the logical low state.

As mentioned above, when the rotating direction deciding processing by the rotating direction deciding unit 6 is completed, the output unit 7 executes output signal producing processing. As mentioned in FIG. 9, the output unit 7 first decides, as deciding processing of step S71, whether the signal level of the signal D outputted from the rotating direction deciding unit 6 is the signal level associated with the logical high state.

If the signal level of the signal D is the signal level associated with the logical high state (the deciding processing of step S71 is concluded in the affirmative or with Yes), it means that the rotating direction of the crank rotor 1 is the direction of normal rotation. Consequently, as processing of step S72, a signal level band is set to, for example, a range from 0.0 V to 5.0 V. On the other hand, if the signal level of the signal D is the signal level associated with the logical low state (deciding processing of step S71 is concluded in the negative or with No), it means that the rotating direction of the crank rotor 1 is the direction of reverse rotation. Consequently, as processing of step S73, the signal level band is set to, for example, a range from 2.5 V to 5.0 V.

When the processing of step S72 or S73 is completed, the output unit 7 produces, as processing of step S74, the first phase difference-compensated output signal PHA_R within the signal level band set through the series of pieces of processing of steps S71 to S73, and outputs the signal to the output terminal.

The foregoing example of operations performed by the signal processing circuit 2 will be further described with reference to FIG. 10. Here, XA represents that a phase of PHA is ahead of the phase of PHB. XB represents a first logic retaining period, XC represents a changing point of PHB, and XD represents a second logic retaining period. XE represents that a signal lags because of a noise. XF represents that a processing of forcibly sustaining immediately preceding phase relationship is performed. Incidentally, FIG. 10 indicates an example of operations to be performed in the same situation as the example of operations indicated by FIG. 4.

Figure 10:
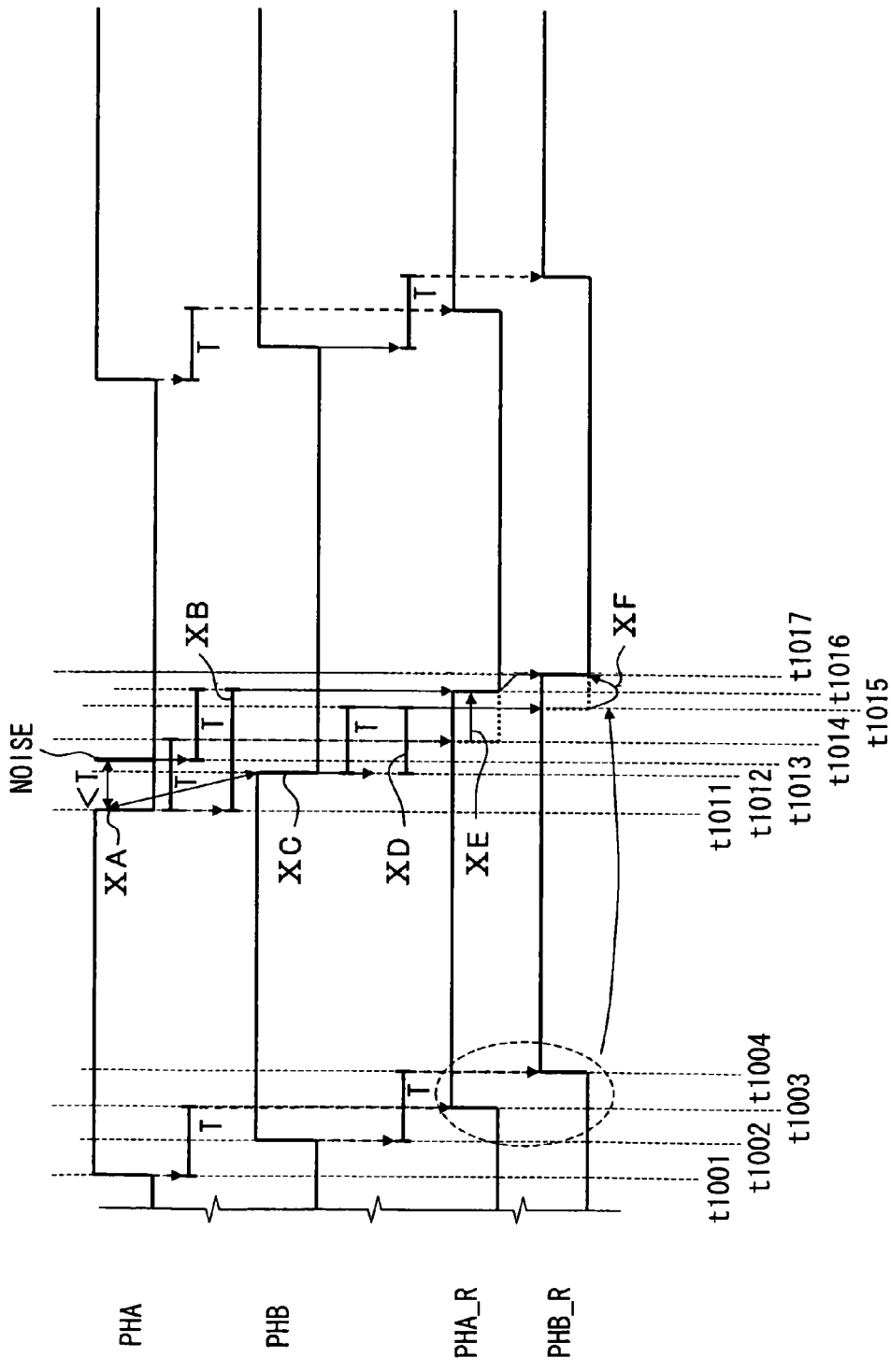
FIG. 10 is a timing chart including graphs of waves PHA and PHB that show examples of the waveforms of the first and second pulsating signals PHA and PHB, and graphs of waves PHA_R and PHB_R that show examples of the waveforms of first and second phase difference-compensated output signals PHA_R and PHB_R.

As shown in the graph of wave PHA of FIG. 10, the first pulsating signal PHA shall rise from the signal level associated with the logical low state to the signal level associated with the logical high state at, for example, a time instant t1001, and shall fall from the signal level associated with the logical high state to the signal level associated with the logical low state at, for example, a time instant t1011. Moreover, the second pulsating signal PHB shall, as shown in the graph of wave PHS of FIG. 10, rise from the signal level associated with the logical low state to the signal level associated with the logical high state at, for example, a time instant t1002, and shall fall from the signal level associated with the logical high state to the signal level associated with the logical low state at a time instant t1012. In this case, based on the first and second pulsating signals PHA and PHB and the first and second filtered signals PHA_SOR and PHB_SOR (not shown in FIG. 10), the phase difference compensation substantiating block 51 decides whether the lengths of the first and second logic retaining periods are different from each other (deciding processing of step S51 (see FIG. 7)). Since the first and second logic retaining periods correspond to the predetermined period T, the phase difference compensation substantiating block 51 outputs, as shown in the graphs of waves PHA_R and PHB_R of FIG. 10, the first and second filtered signal PHA_SOR and PHB_SOR as the first and second phase difference-compensated output signals PHA_R and PHB_R without any change. Specifically, as shown in the graph of wave PHA_R of FIG. 10, the first phase difference-compensated output signal PHA_R rises from the signal level associated with the logical low state to the signal level associated with the logical high state at, for example, a time instant t1003 that comes in the predetermined period T after the time instant t1001. As shown in the graph of wave PHB_SOR of FIG. 4, the second filtered signal PHB_SOR rises from the signal level associated with the logical low state to the signal level associated with the logical high state at, for example, a time instant t1004 that comes in the predetermined period T after the time instant t1002. Herein, the phase relationship between the first and second phase difference-compensated output signals PHA_R and PHB_R is identical to the phase relationship between the first and second pulsating signals PHA and PHB. In other words, as the first pulsating signal PHA leads the second pulsating signal PHB, so the first phase difference-compensated output signal PHA_R leads the second phase difference-compensated output signal PHB_R. The phase relationships are sustained.

However, as shown in the graphs of waves PHA and PHB of FIG. 10, noise shall be simultaneously superposed on both the first and second rotational signals at, for example, a time instant t1013 at which the predetermined period T has not elapsed since the time instant t1011, and the adverse effect of the superposed noise shall be manifested in only the first pulsating signal PHA. In this case, the first filtered signal PHA_SOR that is not shown falls from the signal level associated with the logical high state to the signal level associated with the logical low state after having the signal level thereof, which is associated with the logical high state, retained until the time instant t1016 that comes in the predetermined period T after the time instant t1013 at which the adverse effect of the noise is manifested. Therefore, the first logic retaining period is the period from the time instant t1011 to the time instant t1016. On the other hand, since the adverse effect of the superposed noise is not manifested in the second filtered signal PHB_SOR, the second filtered signal PHB_SOR falls from the signal level associated with the logical high state to the signal level associated with the logical low state at a time instant t1015 that comes in the predetermined period T after the time instant t1012. Therefore, the second logic retaining period is the period from the time instant t1012 to the time instant t1015. Consequently, since the aforesaid phase difference compensating condition is established, the phase difference compensation substantiating block 51 executes the aforesaid phase difference compensating processing at the time instant t1016 at which the first logic retaining period comes to an end. Specifically, the phase difference compensation substantiating block 51 prolongs the second logic retaining period, which is supposed to terminate at the time instant t1015 that comes in the predetermined period T after the time instant t1012, until a time instant t1017 that comes in a time equivalent to one-third of the predetermined period T with the time instant t1016, at which the first logic retaining period terminates, as an initial point, and thus forcibly compensates the phase difference between the first and second phase difference-compensated output signals PHA_R and PHB_R. Consequently, the phase relationship between the first and second phase difference-compensated output signals PHA_R and PHB_R attained when the phase difference compensating condition is established (time instant t1016) corresponds to the phase relationship between the first and second phase difference-compensated output signals PHA_R and PHB_R attained immediately before the phase difference compensating condition is established (time instants t1003 and t1004). Eventually, the rotating direction of the crank rotor 1 is accurately decided by the rotating direction deciding unit 7.

A signal processing circuit relating to the present invention is not limited to the configuration presented in the embodiment but can be modified in various manners without a departure from the gist of the present invention. The present invention may be implemented in variants having the aforesaid embodiment modified appropriately. The variants will be mentioned below.

Figure 11:
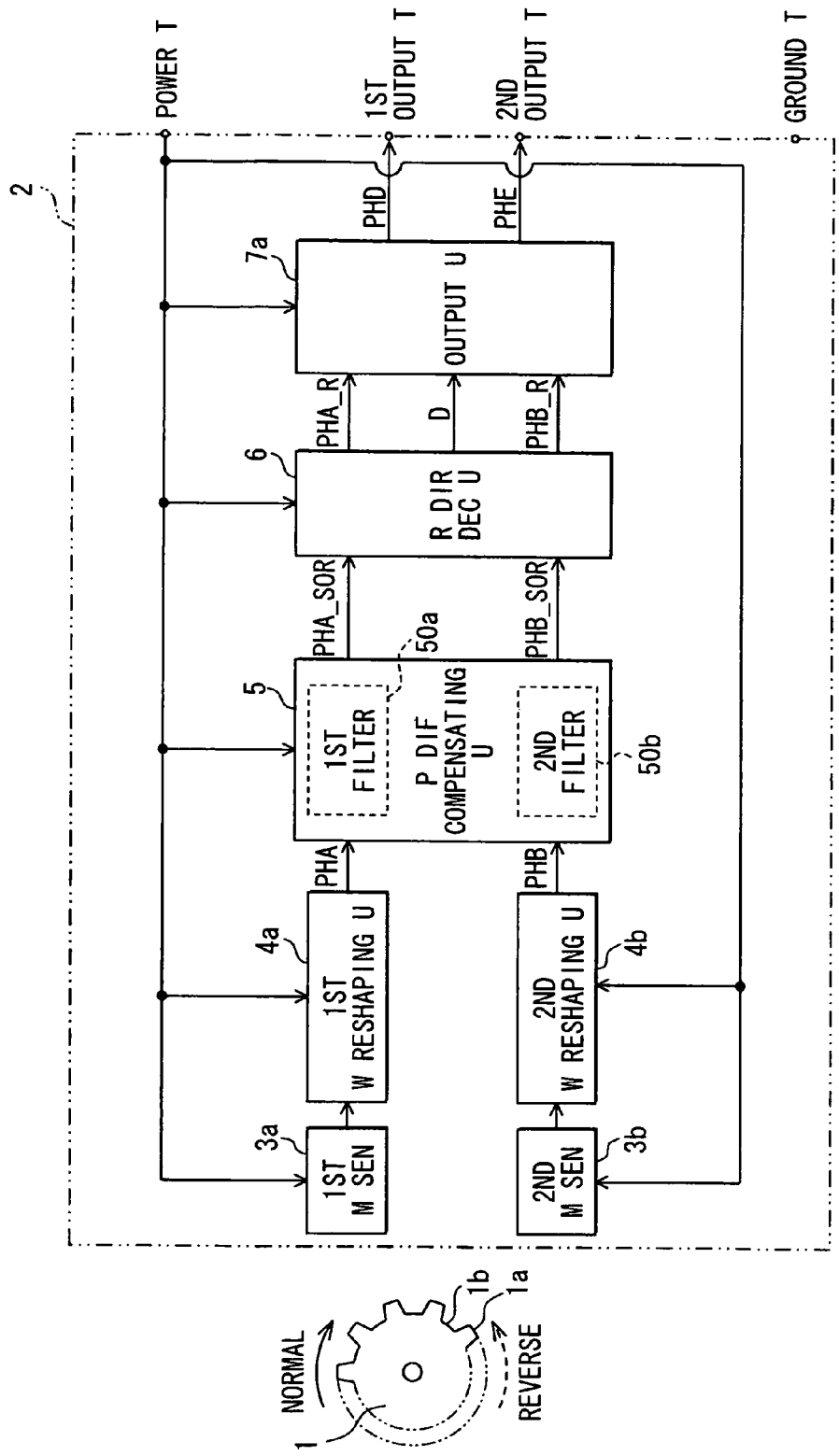
FIG. 11 is an illustrative diagram showing the overall configuration of a variant of a signal processing circuit of a rotation detecting device.

In the aforesaid embodiment, the output unit 7 outputs the third pulsating signal Sc whose signal level differs between a case where the result of decision by the rotating direction deciding unit 6 signifies that the rotating direction of the crank rotor 1 is the direction of normal rotation and a case where the result of decision by the rotating direction deciding unit 6 signifies that the rotating direction of the crank rotor 1 is the direction of reverse rotation. The present invention is not limited to this mode. Alternatively, for example, as shown in the block diagram of FIG. 11 that is comparable to FIG. 1 and that shows the overall configuration of a signal processing circuit 2a in FIG. 6, an output unit 7a outputs a fourth pulsating signal PHD, of which signal level falls, unlike the signal level of the third pulsating signal PHC, within the same signal level band irrespective of the rotating direction of the crank rotor 1, to an output terminal. Further, the output unit 7a may output to a second output terminal a direction deciding signal PHE that when the direction deciding unit 6 decides that the rotating direction of the crank rotor 1 is the direction of normal rotation, is retained at a signal level associated with a logical high state, and that when the rotating direction deciding unit 6 decides that the rotating direction of the crank rotor 1 is the direction of reverse rotation, is retained at a signal level associated with a logical low state. In short, information on the rotating direction of the crank rotor 1 and information on the number of rotations of the crank rotor 1 may be outputted to different output terminals.

In the aforesaid embodiment, the phase difference compensation substantiating block 51 forcibly compensates, as processing of step S53 in FIG. 7, the phase difference by prolonging the shorter one of the first and second logic retaining periods until a period equivalent to one-third of the predetermined period T elapses after the end of the longer logic retaining period. The period is not limited to the period equivalent to one-third of the predetermined period T, but can be varied appropriately. For example, a period equivalent to a half of the predetermined period T may be adopted. Further, the shorter one of the first and second logic retaining periods may be prolonged until the shorter logic retaining period has the same length as the longer logic retaining period after the end of the longer logic retaining period. Moreover, the present invention is not limited to the mode in which when the phase difference compensating condition is established, only the shorter logic retaining period is adjusted at the time of the end of the longer logic retaining period. Not only the shorter logic retaining period is adjusted but also the longer logic retaining period may be adjusted or prolonged very slightly. In short, when the phase difference compensating condition is established, as long as at least the shorter logic retaining period is adjusted at the time of the end of the longer logic retaining period, the advantage comparable to the one of the aforesaid embodiment can be exerted.

In the aforesaid embodiment, as described as the pieces of deciding processing of steps S51 and S52 in FIG. 7, the phase difference compensation substantiating block 51 adopts as the phase difference compensating condition such conditions that the lengths of the first and second logic retaining periods are different from each other and that the change in the signal level of the pulsating signal provided with a shorter logic retaining period occurs within the longer logic retaining period. The phase difference compensating condition is not limited to the conditions. When the lengths of the first and second logic retaining periods are different from each other, the possibility that the adverse effects of noise on the first and second filtered signals PHA_SOR and PHB_SOR are different from each other is high. Therefore, only the condition that the lengths of the first and second logic retaining periods are different from each other may be adopted as the phase difference compensating condition. Namely, the deciding processing of step S52 in FIG. 7 may be excluded. In short, the phase difference compensating condition should merely be a condition relating to the lengths of the first and second logic retaining periods.

In the aforesaid embodiment, as multiple sensor elements that output multiple rotational signals, which are associated with the turning angles of the crank rotor 1, at different phases, the first and second magnetic sensors 3a and 3b formed with magnetoresistive elements (MREs) are adopted. The present invention is not limited to the magnetoresistive elements. For example, sensor elements formed with Hall-effect elements may be adopted. In short, as long as the two rotational signals associated with the turning angles of the crank rotor 1 can be outputted at different phases, the construction of the sensor elements and the operating principle thereof may be arbitrary ones.

In the aforesaid embodiment, the present invention is embodied as a rotation detecting device that detects the rotating direction of a crankshaft of an onboard engine and the number of rotations thereof. The implement of the present invention is not limited to the rotation detecting device. For example, the invention may be embodied as a rotation detecting device that detects the rotating direction of a cam shaft of an onboard engine and the number of rotations thereof. In short, as long as a rotation detecting device detects the rotating direction of an object of detection and the number of rotations thereof on the basis of the rotating direction of a rotor, which rotates along with the rotation of the object of detection, and the number of rotations thereof, the object of detection may be an arbitrary one.

Second Embodiment

Figure 12:
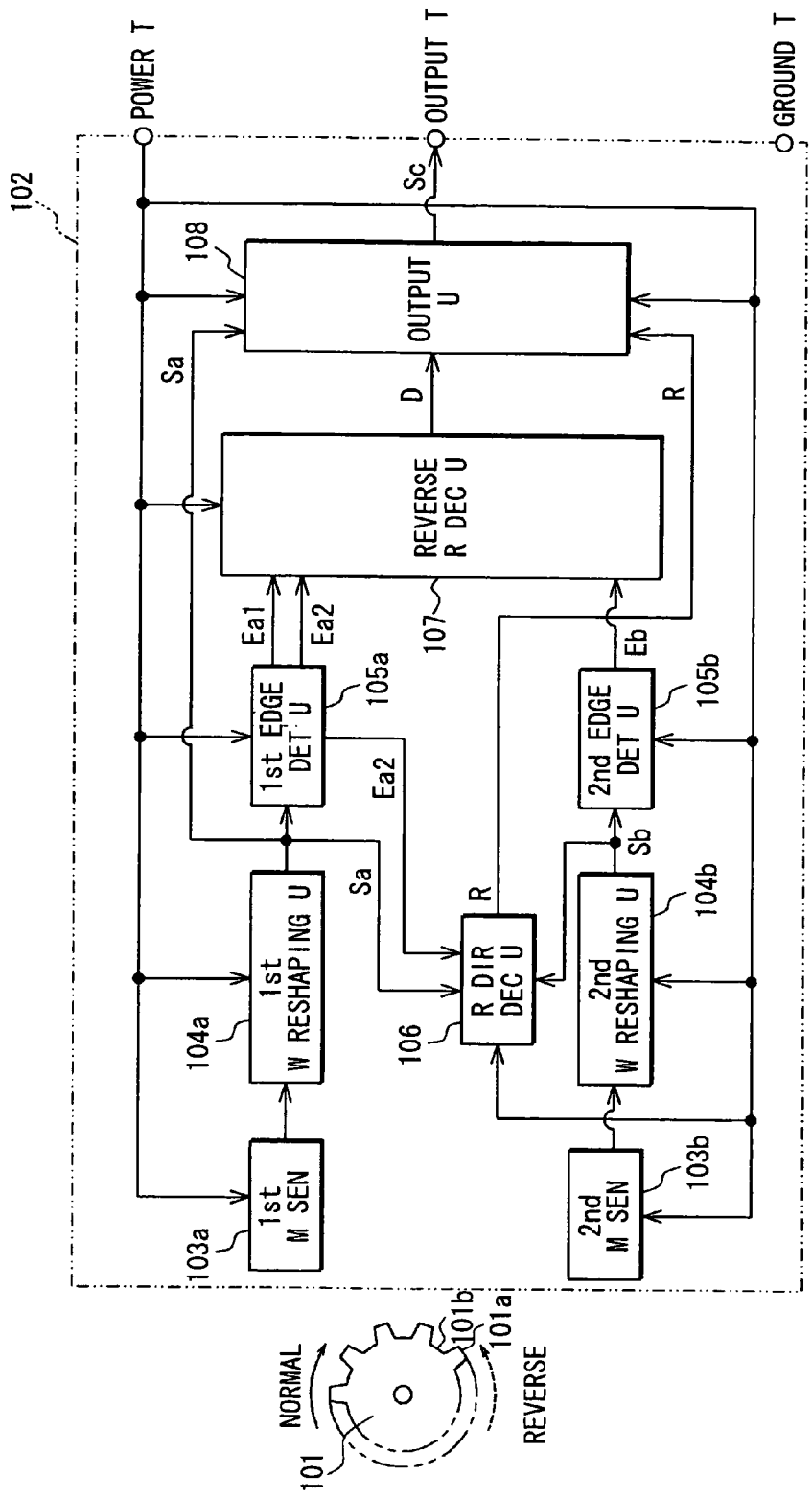
FIG. 12 is an illustrative diagram showing the overall configuration of a second embodiment of a signal processing circuit of a rotation detecting device.

Referring to FIG. 12 to FIG. 20, an embodiment of a signal processing circuit of a rotation detecting device will be described below. FIG. 12 is a block diagram showing the overall configuration. To begin with, referring to FIG. 12, the configuration of the signal processing circuit of a rotation detecting device (hereinafter may be simply called the signal processing circuit) will be described below.

The object of detection of the present embodiment is, for example, a crankshaft of an onboard engine (not shown). In reality, the present embodiment produces and outputs rotational information including the rotating direction of a crank rotor 101 that rotates along with the rotation of the crankshaft. Based on the rotational information, the rotational information on the crankshaft, for example, the turning angle of the crankshaft, the number of rotations per a unit time, and the rotating direction are acquired by an appropriate processing circuit or an ECU that is not shown and that is connected in a succeeding stage. The crank rotor 101 is formed with, for example, a magnetic body, and has ridges 101a and valleys 101b formed alternately on the periphery thereof with a predetermined pitch between adjoining ones.

As shown in FIG. 12, the signal processing circuit 102 fundamentally includes first and second magnetic sensors (sensor elements) 103a and 103b, first and second waveform reshaping units 104a and 104b, first and second edge detecting units 105a and 105b, a rotating direction deciding unit 106, a reverse rotation deciding unit 107, and an output unit 108.

The first and second magnetic sensors 103a and 103b are formed with, for example, magnetoresistive elements (MREs), and are opposed to the periphery of the crank rotor 101. Moreover, the distance between the first and magnetic sensors 103a and 103b is set to a distance calculated by adding or subtracting a distance equivalent to a quarter of the pitch to or from a distance equivalent to an integral multiple of the pitch between the adjoining ridges 101a. The first and second magnetic sensors 103a and 103b output rotational signals, each of which is associated with the turning angle of the crank rotor 101, to the first and second waveform reshaping units 104a and 104b respectively connected in succeeding stages. More particularly, when any of the ridges 101a on the periphery of the crank rotor 101 is opposed to the first or second magnetic sensor, the magnetic sensor outputs a rotational signal of, for example, 5.0 V. When any of the valleys 101b of the crank rotor 101 is opposed to the first or second magnetic sensor, the magnetic sensor outputs a rotational signal of, for example, 0.0 V.

The first and second waveform reshaping units 104a and 104b reshape the waveforms of the rotational signals, which are fetched from the first and second magnetic sensors 103a and 103b respectively, into the waveforms of pulsating signals, and output the resultant waves as first and second pulsating signals Sa and Sb which have a phase difference of, for example, ¼ as shown in, for example, the graphs of waves Sa and Sb of FIG. 19 and FIG. 20 which will be referred to later. The output terminals of the first and second waveform reshaping units 104a and 104b are, as shown in FIG. 12, connected to the input terminals of the first and second edge detecting units 105a and 105b respectively, and are also connected to the input terminal of the rotating direction deciding unit 106. Further, the output terminal of the first waveform reshaping unit 104a is, as shown in FIG. 12, also connected to the input terminal of the output unit 108.

The first edge detecting unit 105a is formed mainly with a circuit including a D type flip-flop that is not shown. The input terminal of the first edge detecting unit 105a is connected to the output terminal of the first waveform reshaping unit 104a, and the first edge detecting unit 105a fetches the first pulsating signal Sa. Based on the thus fetched first pulsating signal Sa, the first edge detecting unit 105a detects the leading and trailing edges of the first pulsating signal. Specifically, as shown in the graphs of waves Ea1 and Ea2 of FIG. 19 or FIG. 20 which will be referred to later, the first edge detecting unit 105a produces the edge signal Ea1 containing edges associated with the leading and trailing edges of the first pulsating signal Sa, and the edge signal Ea2 containing edges associated with the trailing edges of the first pulsating signal Sa. Moreover, the output terminal of the first edge detecting unit 105a is connected to the input terminal of the reverse rotation deciding unit 107. The first edge detecting unit 105a outputs the edge signals Ea1 and Ea2, which are produced as mentioned above, to the input terminal of the reverse rotation deciding unit 107.

The second edge detecting unit 105b is formed mainly with a circuit including a D type flip-flop that is not shown. The input terminal of the second edge detecting unit 105b is connected to the output terminal of the second waveform reshaping unit 104b, and the second edge detecting unit 105b fetches the second pulsating signal Sb. Based on the thus fetched second pulsating signal Sb, the second edge detecting unit 105b detects the leading and trailing edges of the second pulsating signal. Specifically, the second edge detecting unit 105b produces an edge signal Eb that contains, as shown in the graph of wave Eb of FIG. 19 or FIG. 20, edges associated with the leading and trailing edges of the second pulsating signal Sb. Moreover, the output terminal of the second edge detecting unit 105b is connected to the input terminal of the reverse rotation deciding unit 107, and the second edge detecting unit 105b outputs the edge signal Eb, which is produced as mentioned above, to the input terminal of the reverse rotation deciding unit 107.

The rotating direction deciding unit 106 is formed with a circuit including numerous D type flip-flops which are not shown, or a microcomputer or the like. The input terminal of the rotating direction deciding unit 106 is connected to the output terminals of the first and second waveform reshaping units 104a and 104b and of the first edge detecting unit 105a, and the rotating direction deciding unit 106 fetches the first and second pulsating signals Sa and Sb and the edge signal Ea2. Based on the relationship of the phases of the first and second pulsating signals Sa and Sb, that is, based on whether the first pulsating signal Sa leads the second pulsating signal Sb or the second pulsating signal Sb leads the first pulsating signal Sb, the rotating direction deciding unit 106 repeatedly decides at every predetermined first deciding timing whether the rotating direction of the crank rotor 101 is the direction of normal rotation or the direction of reverse rotation that is opposite to the direction of normal rotation. Moreover, the rotating direction deciding unit 106 temporarily stores and holds the result of the decision concerning the rotating direction of the crank rotor 101 in an appropriate storage holding unit (not shown) until the next first deciding timing. In the present embodiment, the normal rotation and reverse rotation decided by the rotating direction deciding unit 106 shall be, for example, clockwise rotation and counterclockwise rotation respectively in FIG. 12. Moreover, as the first deciding timings, the timings at each of which the edge associated with the trailing edge is detected in the edge signal Ea2 outputted from the first edge detecting unit 105a. The output terminal of the rotating direction deciding unit 106 is connected to the input terminal of the output unit 108. A signal R representing the result of the decision concerning the rotating direction is outputted to the input terminal of the output unit 108. A concrete deciding method concerning the rotating direction of the crank rotor 101 will be described later with reference to FIG. 13 and FIG. 14.

The reverse rotation deciding unit 107 is formed with a circuit including numerous D type flip-flops that are not shown or with a microcomputer or the like that is not shown. The input terminal of the reverse rotation deciding unit 107 is connected to the output terminals of the first and second edge detecting units 105a and 105b respectively, and the reverse rotation deciding unit 107 fetches the edge signals Ea1 and Eb. The output terminal of the reverse rotation deciding unit 107 is connected to the input terminal of the output unit 108, and outputs a signal D, which represents the result of decision concerning whether the rotating direction of the crank rotor 101 has been reversed, to the input terminal of the output unit 108. A concrete deciding method concerning whether the rotating direction of the crank rotor 101 has been reversed will be described later with reference to FIG. 13 and FIG. 15.

Moreover, the output unit 108 is formed with, for example, a microcomputer or the like. The output unit 108 has the input terminal thereof connected to the rotating direction deciding unit 106, reverse rotation deciding unit 107, and first waveform reshaping unit 104a, and fetches the signal R, which represents the result of decision concerning the rotating direction of the crank rotor 101, a signal D which represents the result of decision concerning whether the rotating direction of the crank rotor 101 has been reversed, and the first pulsating signal Sa. The output unit 108 has the output terminal thereof connected to the output terminal of the signal processing circuit 102, and outputs a third pulsating signal Sc to the output terminal of the signal processing circuit 102. The third pulsating signal Sc produced and outputted by the output unit 108 will be described later with reference to FIG. 13 and FIG. 16.

Moreover, the components of the signal processing circuit 102 are, as shown in FIG. 12, connected to a power feed terminal and a ground terminal. The components of the signal processing circuit 102 are connected to the power feed terminal, and the terminal of an external power supply such as a battery that is not shown and is disposed outside the signal processing circuit 102 is connected to the power feed terminal. Power is fed from the external power supply to the components. Further, the components of the signal processing circuit 102 each have a built-in clock that is not shown, and execute various pieces of processing, which will be described later, synchronously with clock signals outputted from the clocks.

Figure 13:
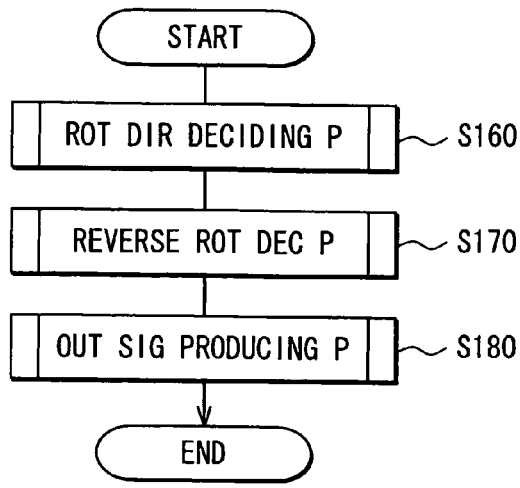
FIG. 13 is a flowchart describing rotating direction deciding processing, reverse rotation deciding processing, and output signal producing/outputting processing which are executed in the signal processing circuit.
Figure 14:
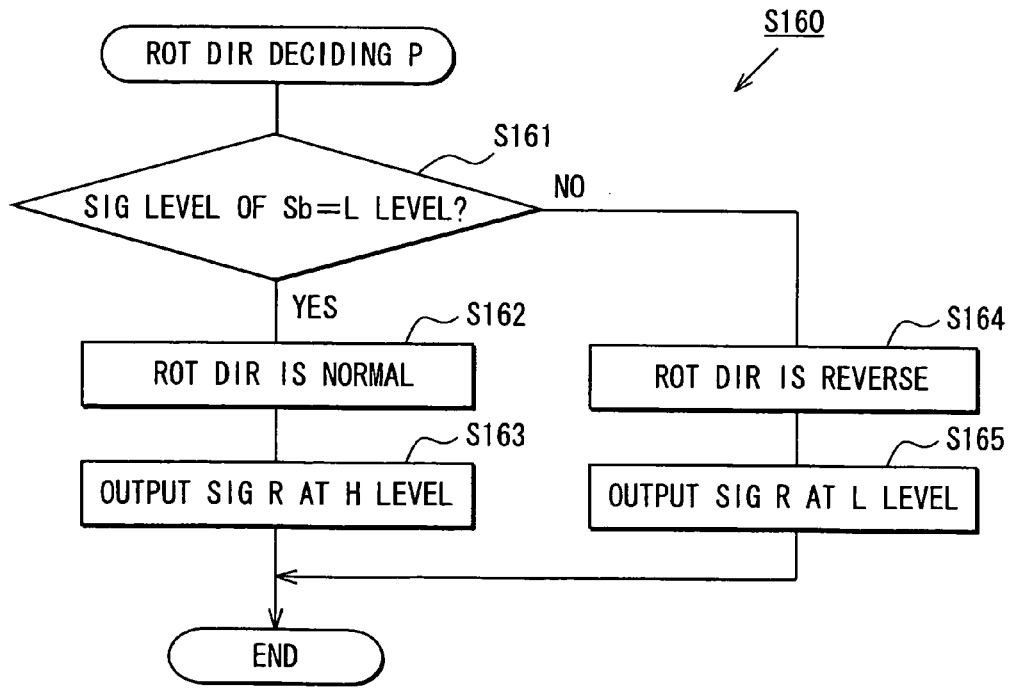
FIG. 14 is a flowchart describing the procedure of the rotating direction deciding processing to be executed by a rotating direction deciding unit included in the signal processing circuit.
Figure 15:
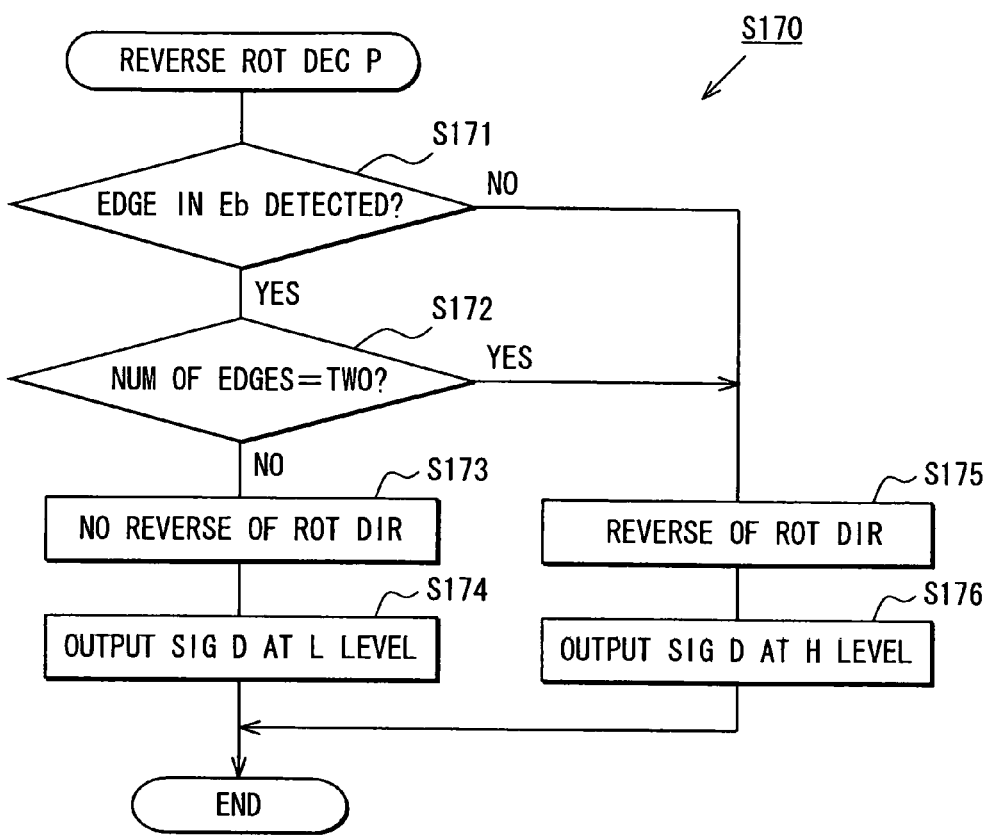
FIG. 15 is a flowchart describing the procedure of the reverse rotation deciding processing to be executed by a reverse rotation deciding unit included in the signal processing circuit.
Figure 16:
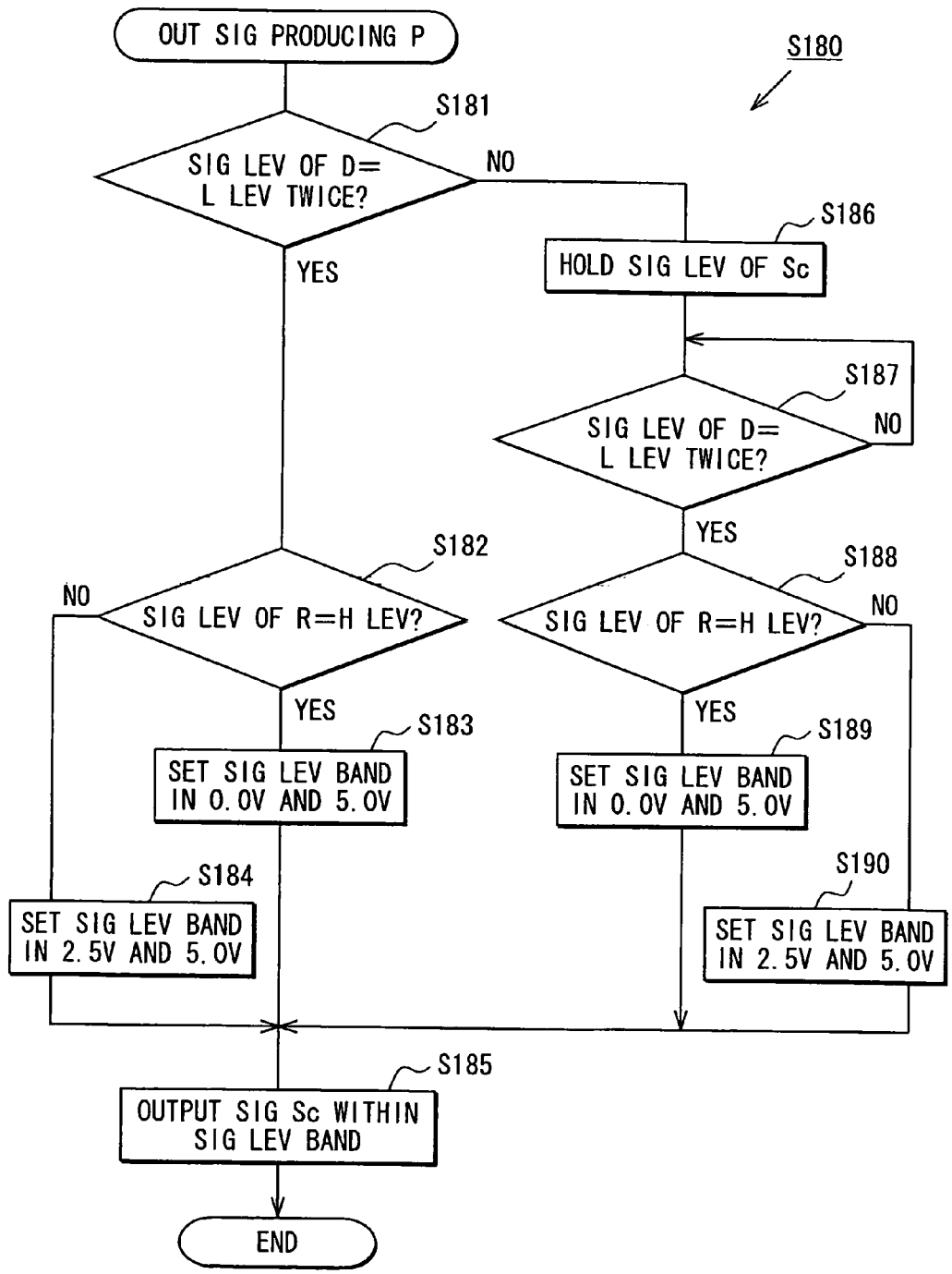
FIG. 16 is a flowchart describing the procedure of the output signal producing/outputting processing to be executed by an output unit included in the signal processing circuit.

Referring to FIG. 13 to FIG. 16, the operations performed by the components of the signal processing circuit 102 of the present embodiment will be described below. FIG. 13 is a flowchart presenting the procedures of rotating direction deciding processing, reverse rotation deciding processing, and output signal producing/outputting processing which are executed in the present embodiment. FIG. 14 is a flowchart describing the procedure of the rotating direction deciding processing to be executed by the rotating direction deciding unit. FIG. 15 is a flowchart describing the procedure of the reverse rotation deciding processing to be executed by the reverse rotation deciding unit. FIG. 16 is a flowchart describing the procedure of the output signal producing/outputting processing to be executed by the output unit.

To begin with, as shown in FIG. 13, when power is fed from the external power supply to the components of the signal processing circuit 102 via the power feed terminal, the rotating direction deciding unit 106 executes rotating direction deciding processing, which will be described later with reference to FIG. 14, as the processing of step S160. After the rotating direction deciding processing is executed, the reverse rotation deciding unit 107 executes reverse rotation deciding processing, which will be described later with reference to FIG. 15, as the processing of step S170. After the reverse rotation deciding processing is executed, the output unit 108 executes output signal producing/outputting processing, which will be described later with reference to FIG. 16, as the processing of step S180. The processing circuit 102 repeatedly executes the series of pieces of processing of steps S160 to S180.

To be more specific, the rotating direction deciding unit 106 is, as mentioned above, connected to the first and second waveform reshaping circuits 104a and 104b and the first edge detecting unit 105a, and executes the rotating direction deciding processing described in FIG. 14 on the basis of the first and second pulsating signals Sa and Sb synchronously with each of edges contained in the edge signal Ea2. Specifically, when the rotating direction deciding unit 106 detects an edge in the edge signal Ea2, the rotating direction deciding unit 106 decides as the deciding processing of step S161 whether the signal level of the second pulsating signal Sb is a signal level associated with a logical high state.

If the signal level of the second pulsating signal Sb is the signal level associated with the logical high state (Yes or the deciding processing of step S161 is concluded in the affirmative), since the signal level of the second pulsating signal Sb is the signal level associated with the logical high state at the timing of the fall of the first pulsating signal Sa, the first pulsating signal Sa leads the second pulsating signal Sb. Consequently, the rotating direction deciding unit 106 decides, as the processing of step S162, that the rotating direction of the crank rotor 101 is the direction of normal rotation, and outputs, as the processing of step S163, a signal R to the output unit 108 at a high logic level, that is, the signal level associated with the logical high state continuously until the next first deciding timing.

On the other hand, if the signal level of the second pulsating signal Sb is not the signal level associated with the logical high state, that is, if the signal level of the second pulsating signal Sb is a signal level associated with a logical low state (No or the deciding processing of step S161 is concluded in the negative), since the signal level of the second pulsating signal Sb is the signal level associated with the logical low state at the timing of the fall of the first pulsating signal Sa, the second pulsating signal Sb leads the first pulsating signal Sa. Consequently, the rotating direction deciding unit 106 decides, as the processing of step S164, that the rotating direction of the crank rotor 101 is the direction of reverse rotation, and outputs, as the processing of step S165, the signal R to the output unit 108 at a low logic level, that is, the signal level associated with the logical low state continuously until the next first deciding timing.

After the rotating direction deciding processing by the rotating direction deciding unit 106 is terminated, the reverse rotation deciding unit 107 executes reverse rotation deciding processing. The reverse rotation deciding unit 107 is, as mentioned above, connected to the first and second edge detecting units 105a and 105b, and executes reverse rotation deciding processing described in FIG. 15 on the basis of the first and second edge signals Ea1 and Eb synchronously with each of edges contained in the edge signal Ea1.

FIG. 17A to FIG. 17D and FIG. 18A to FIG. 18D show the waveforms of the first pulsating signal Sa and second pulsating signal Sb attained when the rotating direction of the crank rotor 101 has been reversed. The inventors have confirmed that when the rotating direction of the crank rotor 101 has been reversed, the first pulsating signal Sa and second pulsating signal Sb take on the waveforms of any of eight patterns shown in FIG. 17A to FIG. 18D.

Figure 17A:
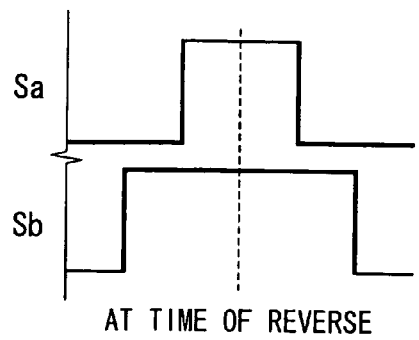
FIG. 17A to FIG. 17D show the waveforms of a first pulsating signal Sa and a second pulsating signal Sb observed when the rotating direction of a crank rotor is reversed.
Figure 17B:
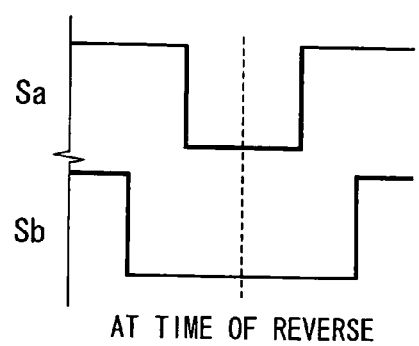
Figure 17C:
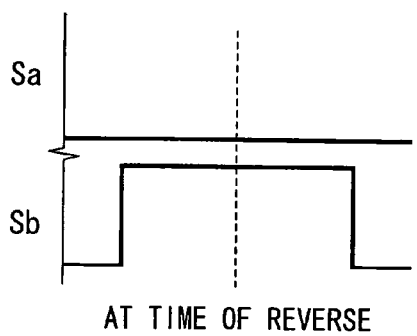
Figure 17D:
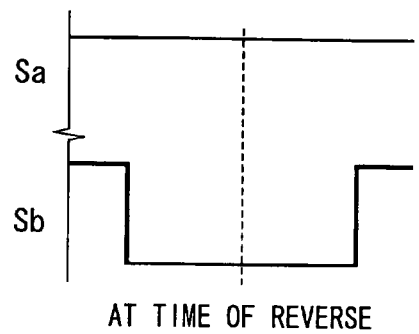

Specifically, FIG. 17A shows the waveforms of the first and second pulsating signals Sa and Sb attained in a case where when two adjoining ones of the ridges 101a are opposed to the first and second magnetic sensors 103a and 103b, the rotating direction of the crank rotor 101 is changed from the direction of reverse rotation to the direction of normal rotation. Likewise, FIG. 17B shows the waveforms of the first and second pulsating signals Sa and Sb attained in a case where when two adjoining ones of the valleys 101b are opposed to the first and second magnetic sensors 103a and 103b, the rotating direction of the crank rotor 101 is changed from the direction of reverse rotation to the direction of normal rotation. On the other hand, FIG. 17C shows the waveforms of the first and second pulsating signals Sa and Sb attained in a case where when adjoining ones of the valleys 101b and ridges 101a are opposed to the first and second magnetic sensors 103a and 103b, the rotating direction of the crank rotor 101 is repeatedly changed from the direction of reverse rotation to the direction of normal rotation and from the direction of normal rotation to the direction of reverse rotation for a short period of time, and finally changed to the direction of normal rotation. Likewise, FIG. 17D shows the waveforms of the first and second pulsating signals Sa and Sb attained in a case where when adjoining ones of the ridges 101a and valleys 101b are opposed to the first and second magnetic sensors 103a and 103b, the rotating direction of the crank rotor 101 is repeatedly changed from the direction of reverse rotation to the direction of normal rotation and from the direction of normal rotation to the direction of reverse rotation for a short period of time, and finally changed to the direction of normal rotation.

Figure 18A:
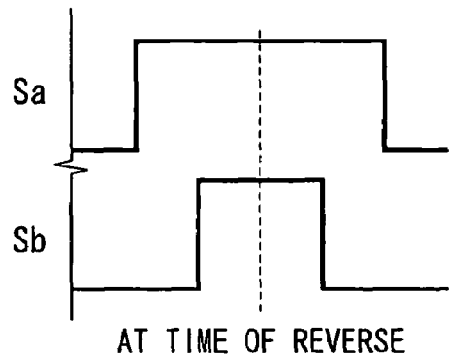
FIG. 18A to FIG. 18D show the waveforms of the first pulsating signal Sa and second pulsating signal Sb observed when the rotating direction of the crank rotor is reversed.
Figure 18B:
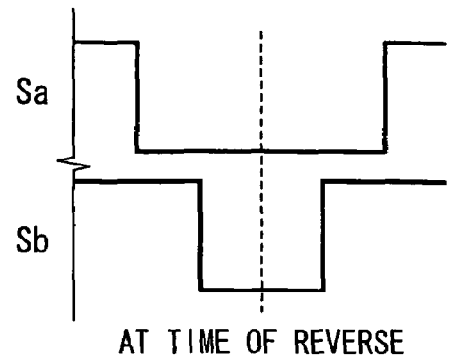
Figure 18C:
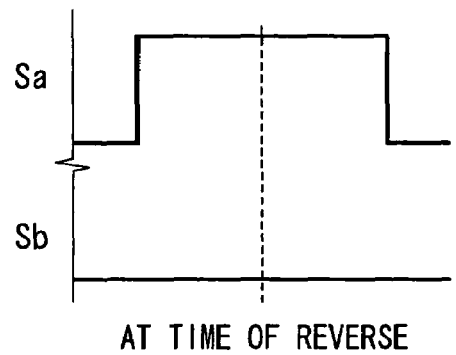
Figure 18D:
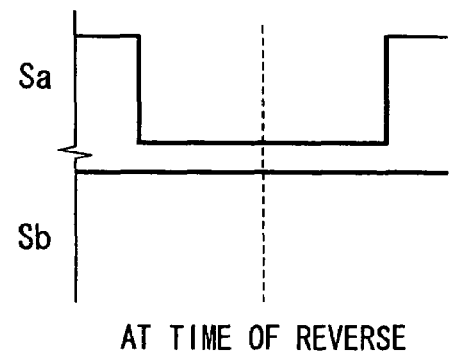

Moreover, FIG. 18A shows the waveforms of the first and second pulsating signals Sa and Sb attained in a case where when two adjoining ones of the ridges 101a are opposed to the first and second magnetic sensors 103a and 103b, the rotating direction of the crank rotor 101 is changed from the direction of normal rotation to the direction of reverse rotation. Likewise, FIG. 18B shows the waveforms of the first and second pulsating signals Sa and Sb attained in a case where when two adjoining ones of the valleys 101b are opposed to the first and second magnetic sensors 103a and 103b, the rotating direction of the crank rotor 101 is changed from the direction of normal rotation to the direction of reverse rotation. On the other hand, FIG. 18C shows the waveforms of the first and second pulsating signals Sa and Sb attained in a case where when adjoining ones of the ridges 101a and valleys 101b are opposed to the first and second magnetic sensors 103a and 103b, the rotating direction of the crank rotor 101 is repeatedly changed from the direction of normal rotation to the direction of reverse rotation and from the direction of reverse rotation to the direction of normal rotation for a short period of time, and is finally changed to the direction of reverse rotation. Likewise, FIG. 18D shows the waveforms of the first and second pulsating signals Sa and Sb attained in a case where when adjoining ones of the valleys 101b and ridges 101a are opposed to the first and second magnetic sensors 103a and 103b, the rotating direction of the crank rotor 101 is repeatedly changed from the direction of normal rotation to the direction of reverse rotation and from the direction of reverse rotation to the direction of normal rotation for a short period of time, and is finally changed to the direction of reverse rotation.

The eight signal waveform patterns are broadly classified into two signal waveform patterns described below. One of the signal waveform patterns is, as shown in FIG. 17A, FIG. 17B, FIG. 18A, and FIG. 18B, such that: in one of the first and second pulsating signals Sa and Sb, two edges are successively detected one by one at times preceding and succeeding the time of the reversal of the rotating direction of the crank rotor 101; and in the other pulsating signal, two edges are detected one by one so that they will precede and succeed the two edges of the one pulsating signal or they will sandwich the two edges of the one pulsating signal. The other signal waveform pattern is, as shown in FIG. 17C, FIG. 17D, FIG. 18C, and FIG. 18D, such that: in one of the first and second pulsating signals Sa and Sb, two edges are successively detected one by one at times preceding and succeeding the time of the reversal of the rotating direction of the crank rotor 101; and in the other pulsating signal, no edge is detected. In the present embodiment, the reverse rotation deciding unit 107 executes, as mentioned previously, decision concerning the reversal of the rotating direction of the crank rotor 101 at every second deciding timing, or in other words, synchronously with the first edge signal Ea1.

Consequently, in consideration of the second deciding timing and FIG. 17A to FIG. 18D, when two edges are successively detected in the second edge signal Eb during a period between two consecutive second deciding timings, that is, from the previous second deciding timing to the current second deciding time, or when no edge is detected in the second edge signal Eb, a decision can be made that the rotating direction of the crank rotor 101 has been reversed. On the other hand, when one edge is detected in the second edge signal Eb during a period between two consecutive second deciding timings, that is, from the previous second deciding timing to the current second deciding timing, a decision can be made that the rotating direction of the crank rotor 101 has not been reversed (the crank rotor 101 is rotating in the same one direction).

As described in FIG. 15, when the reverse rotation deciding unit 107 detects edges in the edge signal Ea1, the reverse rotation deciding unit 107 decides, as deciding processing of step S171, whether edges are detected in the edge signal Eb between two successive edges out of the edges detected in the edge signal Ea1 (i.e., whether edges are detected in the edge signal Eb between two consecutive second deciding timings). At this time, if edges are detected in the edge signal Eb between two successive edges out of the edges detected in the edge signal Ea1 (Yes or the deciding processing of step S171 is concluded in the affirmative), the reverse rotation deciding unit 107 decides, as the deciding processing of step S172, whether the number of edges detected in the edge signal Eb is two. At this time, if the number of edges detected in the edge signal Eb is not two (No or the deciding processing of step S172 is concluded in the negative), the reverse rotation deciding unit 107 outputs a signal D to the output unit 108 at, for example, a low logic level, which signifies that the rotating direction has not been reversed, through the pieces of processing of steps S173 and S174.

On the other hand, if no edge is detected in the edge signal Eb between two successive edges out of the edges detected in the edge signal Ea1 during the deciding processing of step S171 (No or the deciding processing of step S171 is concluded in the negative), or if the number of edges detected in the edge signal Eb is found to be two during the deciding processing of step S172 (Yes or the deciding processing of step S172 is concluded in the affirmative), the reverse rotation deciding unit 107 outputs a signal D to the output unit 108 at, for example, a high logic level, which signifies that the rotating direction has been reversed, through the pieces of processing of steps S175 and S176.

After reverse rotation deciding processing by the reverse rotation deciding unit 107 is terminated as mentioned above, the output unit 108 executes output signal producing/outputting processing. The output unit 108 is, as mentioned above, connected to the first waveform reshaping unit 104a, rotating direction deciding unit 106, and reverse rotation deciding unit 107, and executes the output signal producing/outputting processing described in FIG. 16 on the basis of the first pulsating signal Sa and signals D and R.

To be more specific, the output unit 108 decides twice successively, as described in FIG. 16, as deciding processing of step S181, whether the signal level of the signal D outputted from the reverse rotation deciding unit 107 is the signal level associated with the logical low state. If the signal level of the signal is found twice successively to be the signal level associated with the logical low state (Yes or the deciding processing of step 5181 is concluded in the affirmative), it means that the crank rotor 101 is rotating in the same one direction. Consequently, the output unit 108 decides, as the deciding processing of step S182, whether the signal level of the signal R attained at the first deciding timing immediately preceding the time of the first decision out of a series of decisions (the deciding processing of step S181) is the signal level associated with the logical high state. If the signal level of the signal R is the signal level associated with the logical high state (Yes or the deciding processing of step S182 is concluded in the affirmative), the rotating direction of the crank rotor 101 is the direction of normal rotation. Consequently, the output unit 108 sets a signal level band to a range from 0.0 V to 5.0 V through the pieces of processing of steps S183 and S185, produces a third pulsating signal Sc, and outputs the third pulsating signal Sc to the output terminal. On the other hand, if the signal level of the signal R outputted from the rotating direction deciding unit 106 is found to be the signal level associated with the logical low state during the deciding processing of step S182 (No or the deciding processing of step S182 is concluded in the negative), the rotating direction of the crank rotor 101 is the direction of reverse rotation. Consequently, the output unit 108 sets the signal level band to a range from 2.5 V to 5.0 V through the pieces of processing of steps S84 and S85, produces the third pulsating signal Sc, and outputs the third pulsating signal Sc to the output terminal. After the output unit 108 completes the processing of step S185, the output unit 108 tentatively terminates the output signal producing/outputting processing.

If the signal level of the signal D outputted from the reverse rotation deciding unit 107 is found twice successively not to be the signal level associated with the logical low state during the deciding processing of step S181 (No or the deciding processing of step S181 is concluded in the negative), it means that the rotating direction of the crank rotor 101 has been reversed. Consequently, during the processing of step S186, the output unit 108 continuously outputs (holds) the signal level of the third pulsating signal Sc attained immediately prior to the time of the first decision, which is concluded for the first time that the rotating direction has been reversed, out of the series of decisions (the deciding processing of step S81). The output unit 108 holds the signal level of the third pulsating signal Sc until a decision is made twice successively that the signal level of the signal D is the low logic level (Yes or the deciding processing of step S187 is concluded in the affirmative), that is, until a decision is made twice successively that the rotating direction of the crank rotor 101 has not been reversed. As the deciding processing of step S188, the output unit 108 checks the result of decision concerning the rotating direction of the crank rotor performed at the time of the last decision, which is concluded that the rotating direction has not been reversed, out of the series of decisions (the deciding processing of step S187), or in other words, the output unit 8 decides whether the signal level of the signal R is the high logic level. If the signal level of the signal R is the signal level associated with the logical high state (Yes or the deciding processing of step S188 is concluded in the affirmative), the rotating direction of the crank rotor 101 is the direction of normal rotation. Consequently, the output unit 108 sets the signal level band to the range from 0.0 V to 5.0 V through the pieces of processing of steps S189 and S185, produces the third pulsating signal Sc, and outputs the third pulsating signal Sc to the output terminal. On the other hand, if the signal level of the signal R outputted from the rotating direction deciding unit 106 is found to be the signal level associated with the logical low state during the deciding processing of step S188 (No or the deciding processing of step S188 is concluded in the negative), the rotating direction of the crank rotor 101 is the direction of reverse rotation. Consequently, the output unit 8 sets the signal level band to the range from 2.5 V to 5.0 V through the pieces of processing of steps S190 and S185, produces the third pulsating signal Sc, and outputs the third pulsating signal Sc to the output terminal. When the output unit 108 completes the processing of step S185, the output unit 108 tentatively terminates the output signal producing/outputting processing.

Figure 19:
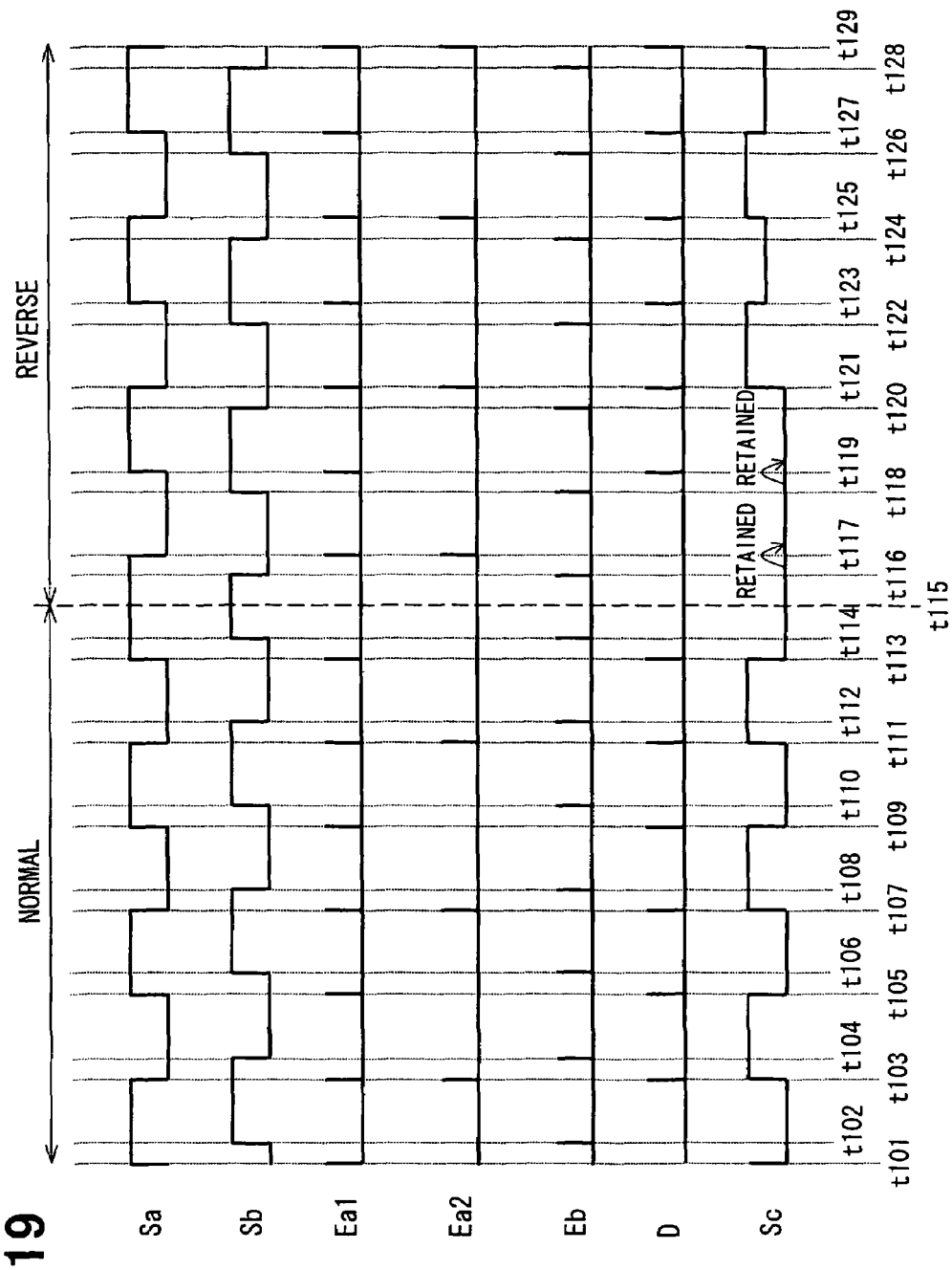
FIG. 19 is a timing chart indicating an example of operations performed by the signal processing circuit.
Figure 20:
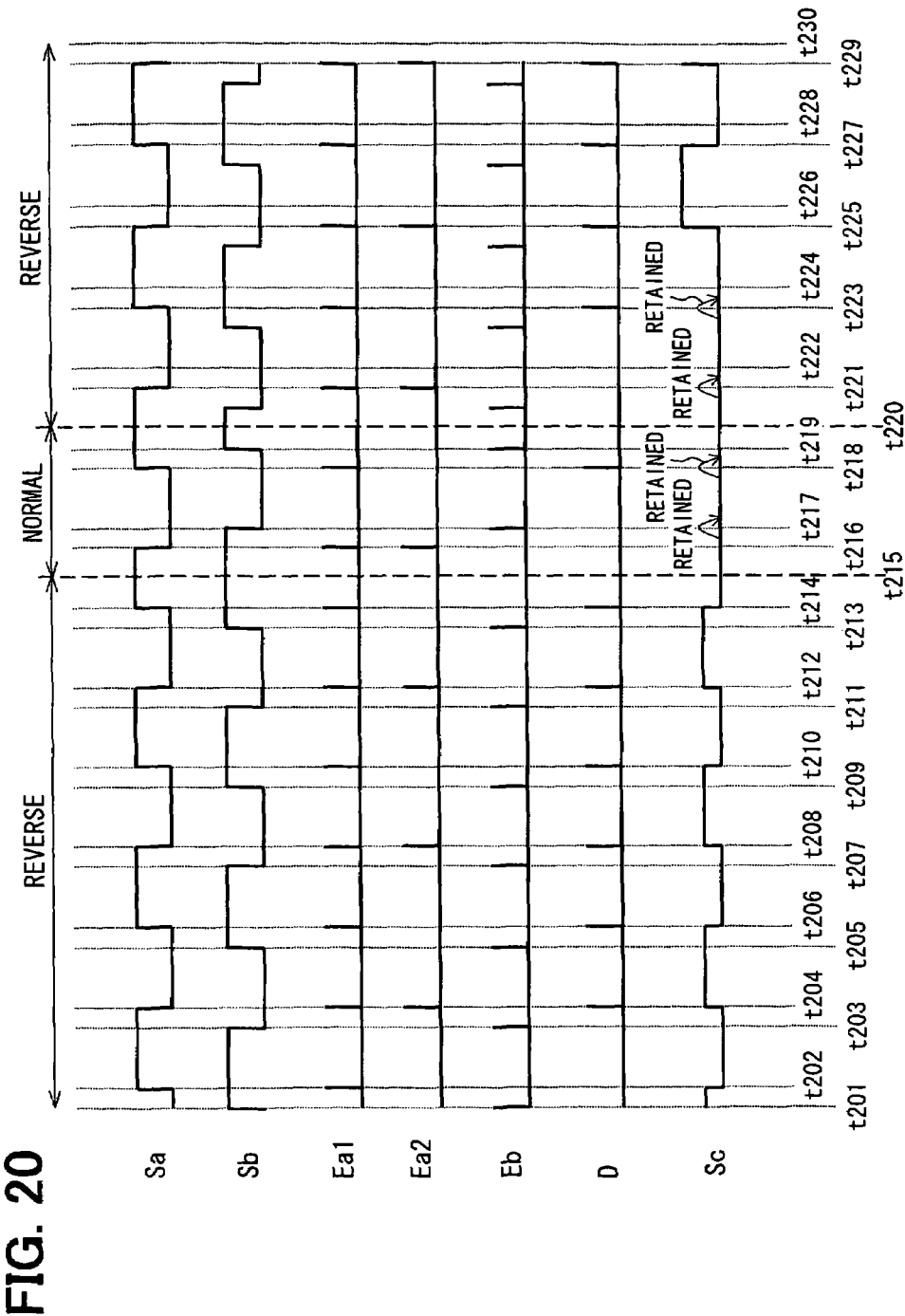
FIG. 20 is a timing chart indicating another example of the operations performed by the signal processing circuit.

Referring to FIG. 19 and FIG. 20, an example of operations performed by the present embodiment will be described below. In FIG. 19, the graphs of waves Sa and Sb show the waveforms of the first and second pulsating signals Sa and Sb that are outputted from the first and second waveform reshaping circuits 4a and 4b in a situation in which the rotation of the crank rotor 101 is changed from normal rotation to reverse rotation at, for example, a time instant t115. As shown in the graphs of waves Sa and Sb of FIG. 19, when the crank rotor 101 is normally rotating, the first and second waveform reshaping units 104a and 104b output the first and second pulsating signals Sa and Sb respectively as shown in the left part of the drawing beyond a dashed line. In this state, the first pulsating signal Sa leads the second pulsating signal Sb. On the other hand, when the crank rotor 101 is reversely rotating, the first and second pulsating signals Sa and Sb are outputted as shown in the right part of the drawing beyond the dashed line. In this state, the second pulsating signal Sb leads the first pulsating signal Sa.

When the ridges 101a of the crank rotor 101 are opposed to the first and second magnetic sensors 103a and 103b, the first and second magnetic sensors 3a and 3b output rotational signals whose levels are associated with a logical high state (for example, 5 V). When the valleys 101b are opposed, the first and second magnetic sensors 103a and 103b output rotational signals whose levels are associated with a logical low state (for example, 0 V). Consequently, the first and second waveform reshaping units 104a and 104b connected to the first and second magnetic sensors 103a and 103b respectively output the first and second pulsating signals Sa and Sb during a period that is equivalent to one pitch, and that starts with a state in which each of the first and second magnetic sensors is opposed to one of the ridges 101a and ends with a state in which each of the first and second magnetic sensors is opposed to the next one of the ridges 101a. The first and second pulsating signals Sa and Sb are outputted to be, as shown in the graphs of waves Sa and Sb of FIG. 19, out of phase by substantially a quarter of the pitch due to the positional relationship between the first and second magnetic sensors 103a and 103b.

Moreover, the graphs of waves Ea1 and Ea2 of FIG. 19 show the waveforms of the edge signals Ea1 and Ea2 which are outputted from the first edge detecting unit 105a in a situation in which the rotation of the crank rotor 101 is changed from normal rotation to reverse rotation at, for example, the time instant t115. As already described and as shown in FIG. 12, the first pulsating signal Sa is inputted to the first edge detecting unit 105a. The first edge detecting unit 105a detects the leading and trailing edges of the first pulsating signal Sa on the basis of the inputted first pulsating signal Sa, and produces the edge signal Ea1 containing edges associated with the leading and trailing edges. The waveform of the first pulsating signal Sa shown in the graph of wave Sa of FIG. 19 is reflected on the waveform of the edge signal Ea1 shown in the graph of wave Ea1 of FIG. 19. Specifically, the edge signal Ea1 has the waveform that show edges at, for example, time instants t101, t103, etc., t127, and t129. Moreover, the first edge detecting unit 105a detects the trailing edges of the first pulsating signal Sa on the basis of the inputted first pulsating signal Sa, and produces the edge signal Ea2 containing edges associated with the trailing edges. Consequently, the waveform of the first pulsating signal Sa shown in the graph of wave Sa of FIG. 19 is partly reflected on the waveform of the edge signal Ea2 shown in the graph of wave Ea2 of FIG. 19. Specifically, the edge signal Ea2 has the waveform that show edges at, for example, time instants t103, t107, etc., t125, and t129.

Moreover, the graph of wave Eb of FIG. 19 shows the waveform of the edge signal Eb that is outputted from the second edge detecting unit in a situation in which the rotation of the crank rotor 101 is changed from normal rotation to reverse rotation at, for example, a time instant t115. As already described and as shown in FIG. 12, the second pulsating signal Sb is inputted to the second edge detecting unit 105b. The second edge detecting unit 105b detects the leading and trailing edges of the second pulsating signal Sb on the basis of the inputted second pulsating signal Sb, and produces the edge signal Eb containing edges associated with the leading and trailing edges. Consequently, the waveform of the second pulsating signal Sb shown in the graph of wave Sb of FIG. 19 is reflected on the waveform of the edge signal Eb shown in the graph of wave Eb of FIG. 19. Specifically, the edge signal Eb has the waveform that shows the edges at, for example, time instants t102, t104, etc., t126, and t128.

The edge signals Ea1, Ea2, and Eb shown in the graphs of waves Ea1 to Eb of FIG. 19 are inputted to the reverse rotation deciding unit 107. As already mentioned, based on the edges contained in the thus inputted edge signals Ea1 and Eb, the reverse rotation deciding unit 107 repeatedly decides at every predetermined second deciding timing whether the rotating direction of the crank rotor 1 has been reversed. Namely, at every second deciding timing that is each of the time instants t101, t103, t105, etc., t127, and t129 shown in the graph of wave Ea1 of FIG. 19, or in other words, synchronously with each of the edges contained in the edge signal Ea1, the reverse rotation deciding unit 107 decides whether the rotating direction of the crank rotor 101 has been reversed.

At, for example, the time instant t107 that is one of the deciding timings, the reverse rotation deciding unit 107 decides whether an edge has occurred in the edge signal Eb between the time instant t107 that is the current deciding timing and the time instant t105 that is the previous deciding timing. If a decision is made that an edge has occurred, whether another edge has successively occurred in the edge signal Eb is decided. In the example of operations indicated by FIG. 19, an edge has occurred in the edge signal Eb at the time instant t106 that is the intermediate time instant between the time instants t105 and t107, but no edge has successively occurred. Therefore, the reverse rotation deciding unit 107 decides that the rotating direction of the crank rotor 1 has not been reversed.

On the other hand, at, for example, the time instant t117 that is one of the deciding timings, similarly to the previous time instant t107, the reverse rotation unit 107 decides whether an edge has occurred in the edge signal Eb between the time instant t117 that is the current deciding timing and the time instant t113 that is the previous deciding timing. If a decision is made that an edge has occurred, whether another edge has successively occurred in the edge signal Eb is decided. In the example of operations indicated by FIG. 19, edges have successively occurred in the edge signal Eb at the time instants t114 and t116 that are intermediate time instants between the time instants t117 and t113. Consequently, the reverse rotation deciding unit 107 decides that the rotating direction of the crank rotor 101 has reversed.

The reverse rotation deciding unit 107 then outputs the signal D, which represents the result of the decision concerning whether the rotating direction of the crank rotor 101 has been reversed, to the output unit 108. Specifically, as shown in the graph of wave D of FIG. 19, the reverse rotation deciding unit 107 produces a signal containing edges, of which signal levels are associated with the logical high state, at the time instants except the time instant t117 at which the decision that the rotating direction of the crank rotor 1 has been reversed is made.

On the other hand, the first pulsating signal Sa shown in the graph of wave Sa of FIG. 19, the second pulsating signal Sb shown in the graph of wave Sb of FIG. 19, and the edge signal Ea2 shown in the graph of wave Ea2 of FIG. 19 are inputted to the rotating direction deciding unit 106. As already mentioned, based on the thus inputted first and second pulsating signals Sa and Sb, the rotating direction deciding unit 106 repeatedly decides the rotating direction of the crank rotor 101 at every predetermined first deciding timing.

To be more specific, the rotating direction deciding unit 106 decides whether the rotating direction of the crank rotor 101 is the direction of normal rotation or the direction of reverse rotation at every first deciding timing, that is, for example, each of time instants t103, t107, t111, etc., t125, t129 shown in the graph of wave Ea2 of FIG. 19, or in other words, synchronously with each of the edges contained in the edge signal Ea2.

At, for example, the time instant t111 that is one of the deciding timings, the rotating direction deciding unit 106 decides whether the signal level of the second pulsating signal Sb is the signal level associated with the logical high state or the signal level associated with logical low state. In the example of operations indicated by FIG. 19, the signal level of the second pulsating signal Eb at the time instant t111 is the signal level associated with the logical high state, the rotating direction deciding unit 106 decides that the first pulsating signal Sa leads the second pulsating signal Sb, or in other words, that the rotating direction of the crank rotor 101 is the direction of normal rotation.

On the other hand, at, for example, the time instant t125 that is one of the deciding timings, similarly to the above time instant t111, the rotating direction deciding unit 106 decides whether the signal level of the second pulsating signal Sb is the signal level associated with the logical high state or the signal level associated with the logical low state. In the example of operations indicated by FIG. 19, the signal level of the second pulsating signal Eb at the time instant t125 is the signal level associated with the logical low state. The rotating direction deciding unit 6 therefore decides that the second pulsating signal Sb leads the first pulsating signal Sa, or in other words, that the rotating direction of the crank rotor 101 is the direction of reverse rotation.

The rotating direction deciding unit 106 outputs a signal R, which represents the result of the decision concerning the rotating direction of the crank rotor 101, to the output unit 108. Specifically, if the rotating direction deciding unit 106 decides at the current deciding timing that the rotating direction of the crank rotor 101 is the direction of normal rotation, the rotating direction deciding unit 6 outputs the signal R to the output unit 108 at the constant signal level of the high logic level (for example, 5.0 V) until the next deciding timing. On the other hand, if the rotating direction deciding unit 6 decides at the current deciding timing that the rotating direction of the crank rotor 101 is the direction of reverse rotation, the rotating direction deciding unit 106 outputs the signal R to the output unit 108 at the constant signal level of the low logic level (for example, 0.0 V) until the next deciding timing.

The first pulsating signal Sa shown in the graph of wave Sa of FIG. 19, the signal D shown in the graph of wave D of FIG. 19, and the signal R are outputted to the output unit 108.

If a decision is made that the rotating direction of the crank rotor 101 has not been reversed, the output unit 108 produces as a third pulsating signal Sc a reverse signal of the first pulsating signal Sa within a signal level band associated with the result of the decision concerning the rotating direction of the crank rotor 101 (that is, the signal level of the signal R), and outputs the third pulsating signal to the output terminal. On the other hand, if a decision is made that the rotating direction of the crank rotor 101 has been reversed, after the decision is made, the output unit 108 holds the signal level of the third pulsating signal Sc, which is outputted immediately before the decision that the rotating direction has been reversed is made, until a decision is made twice successively that the rotating direction of the crank rotor 101 has not been reversed, and outputs the third pulsating signal to the output terminal. In the present embodiment, when the crank rotor 101 is normally rotating, a signal level band ranging, for example, from 0 V to 5 V is adopted. When the crank rotor 101 is reversely rotating, a signal level band ranging, for example, from 2.5 V to 5.0 V is adopted.

Specifically, at, for example, the time instant t111, since the signal level of the signal R that is inputted from the rotating direction deciding unit 106 to the output unit 8 is the high logic level, the crank rotor 101 is rotating in the direction of normal rotation. At the time instant T111, since the signal level of the signal D that is inputted from the reverse rotation deciding unit 107 to the output unit 108 is the high logic level, the rotating direction of the crank rotor 101 has not been reversed. In other words, the crank rotor 101 is continuously rotating in the direction of normal rotation. Therefore, the output unit 108 reverses the first pulsating signal Sa, which is inputted from the first waveform reshaping unit 104a to the output unit 108, within the signal level band that is associated with the normal rotation of the crank rotor 101 and that ranges from 0 V to 5 V, and outputs the reverse signal as the third pulse signal Sc to the output terminal.

The time instant t113 is not a deciding timing at which the rotating direction deciding unit 106 decides the rotating direction of the crank rotor 101. Therefore, the signal level of the signal R is retained at the signal level corresponding to the result of decision performed at the time instant t111 (the high logic level). This means that the crank rotor 101 is rotating in the direction of normal rotation. At the time instant t113, since the signal level of the signal D that is inputted from the reverse rotation deciding unit 107 to the output unit 108 is the high logic level, the rotating direction of the crank rotor 101 has not been reversed. In other words, the crank rotor 101 is continuously rotating in the direction of normal rotation. Therefore, the output unit 108 reverses the first pulsating signal Sa, which is inputted from the first waveform reshaping unit 4a to the output unit 108, within the signal level band that is associated with the normal rotation of the crank rotor 101 and ranges from 0 V to 5 V, and outputs the reverse signal as the third pulsating signal Sc to the output terminal.

Thereafter, at, for example, the time instant t117, since the signal level of the signal R that is inputted from the rotating direction deciding unit 106 to the output unit 108 is the low logic level, the crank rotor 1 is rotating in the direction of reverse rotation. At the time instant t117, since the signal level of the signal D that is inputted from the reverse rotation deciding unit 107 to the output unit 108 is the low logic level, the rotating direction of the crank rotor 101 has been reversed. Therefore, after the time instant t117, the output unit 108 holds the signal level (the signal level associated with the logical low state) of the pulsating signal Sc, which has been outputted immediately prior to the time instant t117, until the reverse rotation deciding unit 107 decides twice successively that the rotating direction of the crank rotor 101 has not been reversed, and outputs the pulsating signal Sc to the output terminal.

Specifically, as shown in FIG. 19, the time instant t121 is the time instant at which the reverse rotation deciding unit 107 decides twice successively after the time instant t117 that the rotating direction of the crank rotor 101 has not been reversed. The output unit 108 therefore reverses the first pulsating signal Sa, which is inputted from the first waveform reshaping unit 104a to the output unit 108, within the signal level band that is associated with the reverse rotation of the crank rotor 1 and that ranges from 2.5 V to 5 V, and outputs the reverse signal as the third pulsating signal Sc to the output terminal.

In the technology described in the patent document 3 mentioned in Description of the Related Art, a masked signal having one pulse part of the first pulsating signal Sa, which starts with the first rise of the first pulsating signal occurring immediately after a decision is made that the rotating direction of the crank rotor 101 is reversed, and ends with the first fall thereof, is used to produce the output signal. Specifically, in the example of operations indicated by FIG. 19, since a decision is made at the time instant t117 that the rotating direction of the crank rotor 101 has been reversed, the masked signal has one pulse of the first pulsating signal Sa shown in the graph of wave Sa of FIG. 19, which lasts from the time instant t117 to the time instant t119, masked. Based on the masked signal, the output signal is produced within the signal level band that is associated with the result of decision concerning the rotating direction of the crank rotor 101 (herein, the direction of reverse rotation) and that ranges from 2.5 V to 5.0 V. As indicated with the dashed like in the graph of wave Sc of FIG. 19, a signal of 2.5 V is outputted as the output signal during a period from the time instant t117 to the time instant t119. As described in Description of the Related Art, there arises a fear that an ECU for vehicle control connected in a succeeding stage cannot appropriately execute various vehicle controls because of the output signal. However, in the present embodiment, as mentioned above and as indicated with a solid line in the graph of wave Sc of FIG. 19, since the third pulsating signal Sc is retained at 0.0 V during the period from the time instant t117 to the time instant t119, the fear will not arise.

Referring to FIG. 20, operations to be performed by the signal processing circuit 102 of the present embodiment will be described below. As shown in FIG. 20, the crank rotor 101 has been rotating in the direction of reverse rotation since a time instant preceding, for example, a time instant t201, has the rotating direction thereof changed from the direction of reverse rotation to the direction of normal rotation at, for example, a time instant t215, and has the rotating direction thereof changed again from the direction of normal rotation to the direction of reverse rotation at a time instant t220. Signals outputted from the components of the processing circuit 102 in this situation are shown.

In the foregoing situation, at the time instant t217, the signal level of the signal D that is inputted from the reverse rotation deciding unit 107 to the output unit 108 is the low logic level, and a decision is made that the rotating direction of the crank rotor 101 has been reversed. Consequently, the output unit 108 holds the signal level of the pulsating signal Sc that has been outputted immediately prior to the time instant t217, that is, holds the signal level associated with the logical low state until after the time instant t217, a decision is made twice successively that the rotating direction of the crank rotor 101 has not been reversed, and outputs the pulsating signal to the output terminal.

At the time instant t218, the signal level of the signal D that is inputted from the reverse rotation deciding unit 107 to the output unit 108 is the high logic level, and a decision is made that the rotating direction of the crank rotor 101 has not been reversed. However, since the decision that the rotating direction has not been reversed has been made once since the time instant t217, the output unit 108 retains the signal level of the pulsating signal Sc, which has been outputted immediately prior to the time instant t217, at the signal level associated with the logical low state, and outputs the pulsating signal to the output terminal.

At the time instant t221, the signal level of the signal D that is inputted from the reverse rotation deciding unit 7 to the output unit 108 is the low logic level, and a decision is made that the rotating direction of the crank rotor 101 has been reversed. Consequently, the output unit 8 holds the signal level of the pulsating signal Sc, which has been outputted immediately prior to the time instant t221, that is, holds the signal level associated with the logical low state until after the time instant t221, a decision is made twice successively that the rotating direction of the crank rotor 101 has not been reversed, and outputs the pulsating signal Sc to the output terminal.

At the time instant t223, the signal level of the signal D that is inputted from the reverse rotation deciding unit 107 to the output unit 108 is the high logic level, and a decision is made that the rotating direction of the crank rotor 101 has not been reversed. However, since the decision that the rotating direction has not been reversed has been made once since the time instant t223, the output unit 108 retains the signal level of the pulsating signal Sc, which has been outputted immediately prior to the time instant t217, at the signal level associated with the logical low state, and outputs the pulsating signal to the output terminal.

At the time instant t225, the signal level of the signal D that is inputted from the reverse rotation deciding unit 107 to the output unit 108 is the high logic level, and a decision is made that the rotating direction of the crank rotor 101 has not been reversed. Since the decision that the rotating direction has not been reversed has been made twice since the time instant t233, the output unit 108 reverses the first pulsating signal Sa, which is inputted from the first waveform reshaping unit 104a to the output unit 108, within the signal level band that is associated with the normal rotation of the crank rotor 101 and that ranges from 0.0 V to 5.0 V, and outputs the reverse signal as the third pulsating signal Sc to the output terminal.

As described so far, according to the rotation detecting device of the present embodiment, the advantage described below can be exerted.

In the aforesaid embodiment, when a decision is made twice successively that the rotating direction of the crank rotor 101 has not been reversed, the output unit 108 produces and outputs an output signal Sc using the result of decision performed on the rotating direction of the crank rotor 101 at the first deciding timing immediately preceding the time of the first decision out of the series of decisions. On the other hand, when a decision is made that the rotating direction of the crank rotor 101 has been reversed, the output unit 108 continuously outputs the signal level of the output signal Sc outputted immediately prior to the time of the first decision, which is concluded for the first time that the rotating direction has been reversed, out of the series of decisions until after the decision that the rotating direction has been reversed is made, a decision is made twice successively that the rotating direction of the crank rotor 101 has not been reversed. After the series of decisions is completed, the output unit 108 produces and outputs the output signal Sc using the result of the last decision, which is concluded last that the rotating direction of the crank rotor 101 has not been reversed, out of the series of decisions. Consequently, for example, when a backlash is present between the crankshaft and crank rotor 101 and a vibration occurs in the crankshaft, even if a microscopic vibration occurs in the crank rotor 101 due to the backlash and the vibration of the crankshaft, such an incident will not take place that: although the crank rotor 101 is substantially stopped, a decision is incorrectly made that the rotating direction of the crank rotor 101 is changed from the direction of normal rotation or the direction of reverse rotation for a short period of time; and the result of the incorrect decision is used to produce and output the output signal Sc. In other words, even when the vibration occurring in the crankshaft is conveyed to the crank rotor 101, the signal processing circuit of a rotation detecting device having the aforesaid configuration can produce and output accurate rotational information including the substantial rotating direction of the crankshaft.

In the foregoing embodiment, the signal processing circuit 102 of a rotation detecting device executes various pieces of processing synchronously with a clock. Consequently, compared with a case where the signal processing circuit 102 executes the various pieces of processing asynchronously but does not execute them synchronously with the clock, operations are stabilized.

In the aforesaid embodiment, the output unit 108 outputs the third pulsating signal Sc whose signal level differs between a case where the result of decision by the rotating direction deciding unit 106 signifies that the rotating direction of the crank rotor 101 is the direction of normal rotation and a case where the result of decision by the rotating direction deciding unit 106 signifies that the rotating direction of the crank rotor 101 is the direction of reverse rotation. Consequently, information on the rotating direction of the crank rotor 101 can be outputted to the output terminal according to the pulse height of the third pulsating signal Sc, and information on the number of rotations of the crank rotor 101 can be outputted to the output terminal according to the number of pulses of the third pulsating signal Sc. In other words, the pieces of information on the rotating direction of the crank rotor 101 and the number of rotations thereof can be transmitted to the outside of the signal processing circuit 102 via the sole output terminal.

In the aforesaid embodiment, as the first predetermined timings of deciding the rotating direction of the crank rotor 101, timings at which trailing edges are detected in the edge signal Ea are adopted. The present invention is not limited to this mode. Alternatively, timings at which leading edges are detected in the edge signal Ea1 or timings at which trailing or leading edges are detected in the edge signal Eb may be adopted.

In the aforesaid embodiment, as the second predetermined timings of deciding whether the rotating direction of the crank rotor 101 has been reversed, timings at which leading and trailing edges are detected in the edge signal Ea1 are adopted. The present invention is not limited to this mode. Alternatively, for example, timings at which the leading and trailing edges are detected in the edge signal Eb may be adopted. In this case, when edges are successively detected in the edge signal Ea1 between two consecutive second deciding timings or when no edge is detected in the edge signal Ea1, the reverse rotation deciding unit 107 may decide that the rotating direction of the crank rotor 101 has been reversed. Otherwise, for example, these two edge signals may be used in combination. Specifically, synchronously with both the edge signal Ea1 and edge signal Eb, based on an edge contained in the edge signal Eb and an edge contained in the edge signal Ea1, the reverse rotation deciding unit 107 may decide that the rotating direction of the crank rotor 101 has been reversed. When the edge signals are used in combination, the decision concerning the reversal of the rotating direction of the crank rotor 101 can be repeatedly executed with high precision. Moreover, as for the second predetermined timings, the decision may not be synchronous with each of the timings at which an edge is detected in at least one of the edge signal Ea1 and edge signal Eb. In short, arbitrary timings will do as long as whether the rotating direction of the crank rotor 101 has been reversed can be detected.

In the aforesaid embodiment, the output unit 108 adopts two as the predetermined number of times. However, the predetermined number of times is not limited to two but may be set to an arbitrary value. In short, as long as the rotating direction of the crankshaft and the number of rotations thereof that are detected based on the rotating direction of the crank rotor 101 and the number of rotations thereof reflect the substantial rotating direction and the substantial number of rotations, any number of times will do.

Figure 21:
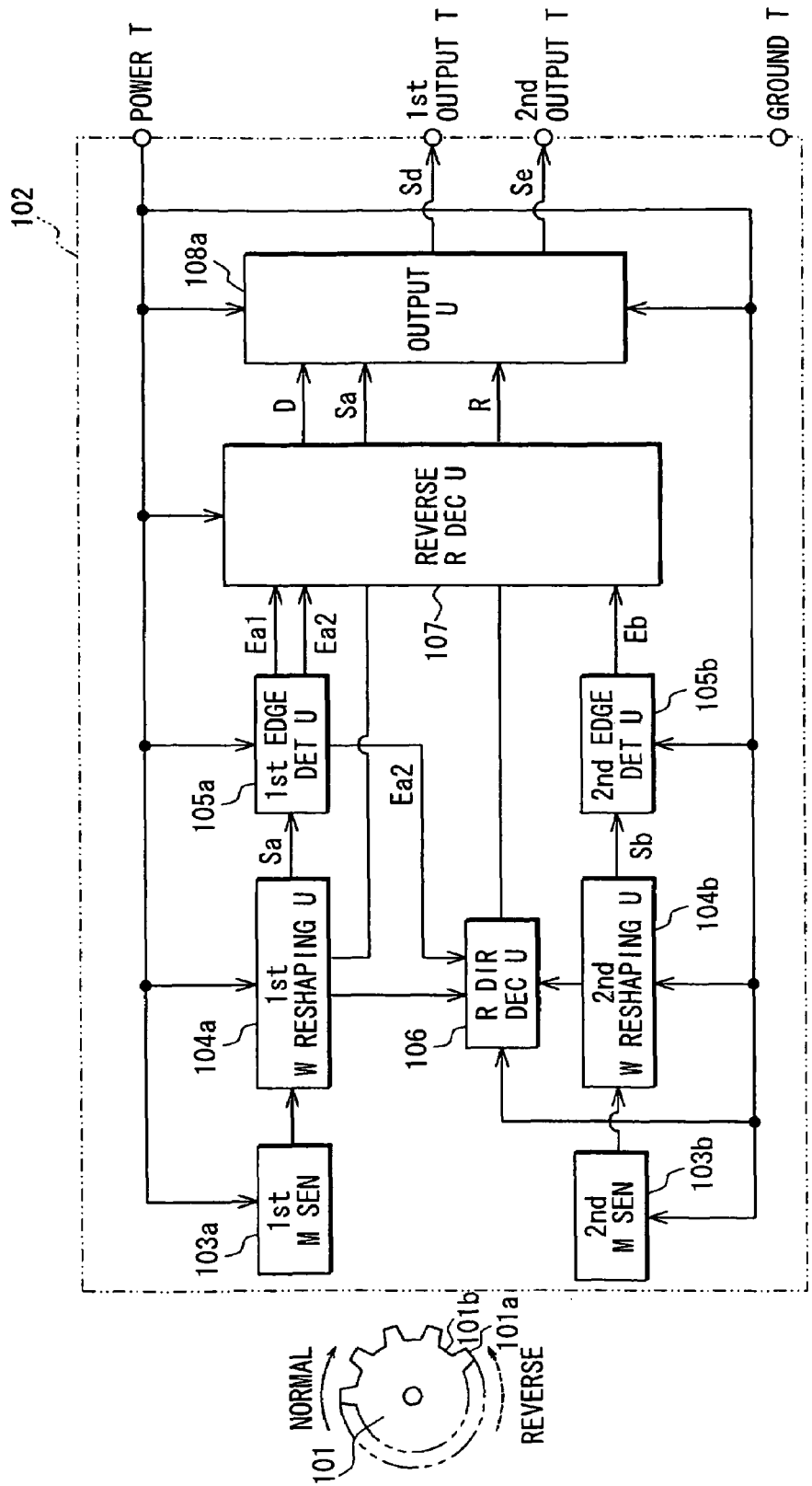
FIG. 21 is a block diagram showing the overall configuration of a variant of a signal processing circuit of a rotation detecting device.

In the aforesaid embodiment, the output unit 108 outputs the third pulsating signal Sc whose signal level differs between a case where the result of decision by the rotating direction deciding unit 106 signifies that the rotating direction of the crank rotor 101 is the direction of normal rotation and a case where the result of decision by the rotating direction deciding unit 106 signifies that the rotating direction of the crank rotor 101 is the direction of reverse rotation. The present invention is not limited to this mode. Alternatively, for example, as shown in the block diagram of FIG. 21 that is comparable to FIG. 12 and that shows the overall configuration of a signal processing circuit 102a in FIG. 17, an output unit 108a outputs a fourth pulsating signal Sd, of which signal level falls, unlike the signal level of the third pulsating signal Sc, within the same signal level band irrespective of the rotating direction of the crank rotor 101, to a first output terminal. Further, the output unit 8a may output to a second output terminal a direction deciding signal Se that when the direction deciding unit 106 decides that the rotating direction of the crank rotor 101 is the direction of normal rotation, is retained at a signal level associated with a logical high state, and that when the rotating direction deciding unit 106 decides that the rotating direction of the crank rotor 101 is the direction of reverse rotation, is retained at a signal level associated with a logical low state. In short, information on the rotating direction of the crank rotor 101 and information on the number of rotations of the crank rotor 101 may be outputted to different output terminals.

In the aforesaid embodiment, as multiple sensor elements that output multiple rotational signals, which are associated with the turning angles of the crank rotor 101, at different phases, the first and second magnetic sensors 103*a* and 103*b* formed with magnetoresistive elements (MREs) are adopted. The present invention is not limited to the magnetoresistive elements. For example, sensor elements formed with Hall-effect elements may be adopted. In short, as long as the two rotational signals associated with the turning angles of the crank rotor 1 can be outputted at different phases, the construction of the sensor elements and the operating principle thereof may be arbitrary ones.

In the aforesaid embodiment, the present invention is embodied as a rotation detecting device that detects the rotating direction of a crankshaft of an onboard engine and the number of rotations thereof. The implement of the present invention is not limited to the rotation detecting device. For example, the invention may be embodied as a rotation detecting device that detects the rotating direction of a cam shaft of an onboard engine and the number of rotations thereof. In short, as long as a rotation detecting device detects the rotating direction of an object of detection and the number of rotations thereof on the basis of the rotating direction of a rotor, which rotates along with the rotation of the object of detection, and the number of rotations thereof, the object of detection may be an arbitrary one.

While the invention has been described with reference to preferred embodiments thereof, it is to be understood that the invention is not limited to the preferred embodiments and constructions. The invention is intended to cover various modification and equivalent arrangements. In addition, while the various combinations and configurations, which are preferred, other combinations and configurations, including more, less or only a single element, are also within the spirit and scope of the invention.

What is claimed is:

1. A signal processing circuit for a rotation detector for detecting rotation of an object, comprising:
   first and second sensor elements for outputting first and second rotation signals, respectively, wherein the first and second rotation signals have individual phases for representing rotation of a rotor that rotates together with the object;
   first and second waveform reshaping elements for reshaping the first and second rotation signals into first and second pulse signals having first and second pulse signal levels, respectively; and
   first and second filters for outputting first and second filter signals having first and second filter signal levels, respectively,
   wherein, when a period in which one of the first and second pulse signal levels is constant is equal to or longer than a predetermined period, a corresponding filter outputs a corresponding filter signal with a corresponding filter signal level after the predetermined period elapses, the corresponding filter signal level being equal to the filter signal level in the period, and
   wherein, when one of the first and second pulse signal levels is changed within the predetermined period, a corresponding filter sets a corresponding one of first and second logic retaining periods in a corresponding filter signal, wherein a corresponding filter signal level is maintained to a previous value during the corresponding one of the first and second logic retaining periods, wherein the previous value is the filter signal level before the change, and wherein the corresponding one of the first and second logic retaining periods is set after the change until the predetermined period elapses;
   a phase difference compensation deciding element for deciding whether one of the first and second logic retaining periods set in a leading one of the first and second filter signals is longer than the other one of the first and second logic retaining periods set in a following one of the first and second filter signals, wherein a noise occurs within the predetermined period so that the leading one precedes the following one;
   a phase difference compensation executing element for outputting first and second phase difference compensation output signals corresponding to the first and second filter signals, respectively,
   wherein, when the phase difference compensation deciding element determines that the one set in the leading one is longer than the other one set in the following one, the phase difference compensation executing element prolongs the other one set in the following one to be equal to or longer than the one set in the leading one so that a phase relationship between the first and second filter signals after decision of the phase difference compensation deciding element is equal to a phase relationship between the first and second filter signals just before the decision of the phase difference compensation deciding element, and the phase difference compensation executing element outputs the first and second filter signals as the first and second phase difference compensation output signals, respectively, and
   wherein, when the phase difference compensation deciding element determines that the one set in the leading one is not longer than the other one set in the following one, the phase difference compensation executing element directly outputs the first and second filter signals as the first and second phase difference compensation output signals, respectively;
   a rotation direction deciding element for repeatedly deciding based on the phase relationship between the first and second phase difference compensation output signals whether a rotation direction of the rotor is a first direction or a second direction, which is opposite to the first direction; and
   an output element for outputting an output signal, which relates to rotation information that includes decision of the rotation direction of the rotor.

2. The signal processing circuit according to claim 1, wherein, when the phase difference compensation deciding element determines that the one set in the leading one is longer than the other one set in the following one, the phase difference compensation executing element prolongs the other one set in the following one to be equal to the one set in the leading one, and outputs the first and second filtered signals as the first and second phase difference compensation output signals.

3. The signal processing circuit according to claim 1, wherein, when the phase difference compensation deciding element determines that the one set in the leading one is longer than the other one set in the following one, the phase difference compensation executing element prolongs the other one set in the following one such that an end of the other one set in the following one is later than an end of the one set in the leading one, and outputs the first and second filtered signals as the first and second phase difference compensation output signals.

4. The signal processing circuit according to claim 1, wherein the output element outputs a third pulse signal having a variable pulse height as the output signal, wherein, when the rotation direction deciding element decides that the rotation direction of the rotor is the first direction, the output element outputs the third pulse signal having a first pulse height, and wherein, when the rotation direction deciding element decides that the rotation direction of the rotor is the second direction, the output element outputs the third pulse signal having a second pulse height, which is different from the first pulse height.

5. The signal processing circuit according to claim 1,
wherein the output element outputs a direction deciding signal having a variable direction deciding signal level as the output signal,
wherein, when the rotation direction deciding element decides that the rotation direction of the rotor is the first direction, the output element outputs the direction deciding signal having a first direction deciding signal level, and
wherein, when the rotation direction deciding element decides that the rotation direction of the rotor is the second direction, the output element outputs the direction deciding signal having a second direction deciding signal level, which is different from the first direction deciding signal level.

6. The signal processing circuit according to claim 1,
wherein each of the plurality of sensor elements is a magnetoresistive element.

7. The signal processing circuit according to claim 1,
wherein the object of detection is a cam shaft of an engine of a vehicle, and
wherein the rotor is coupled with the cam shaft via a gear so that the rotor rotates together with the cam shaft.

8. The signal processing circuit according to claim 1,
wherein the object of detection is a crankshaft of an engine of a vehicle, and
wherein the rotor is a crank rotor.

9. A signal processing circuit for a rotation detector for detecting rotation of an object, comprising:
first and second sensor elements for outputting first and second rotation signals, respectively, wherein the first and second rotation signals have individual phases for representing rotation of a rotor that rotates together with the object;
first and second waveform reshaping elements for reshaping the first and second rotation signals into first and second pulse signals having first and second pulse signal levels, respectively;
first and second filters for outputting first and second filter signals having first and second filter signal levels, respectively,
wherein, when a period in which one of the first and second pulse signal levels is constant is equal to or longer than a predetermined period, a corresponding filter outputs a corresponding filter signal with a corresponding filter signal level after the predetermined period elapses, the corresponding filter signal level being equal to the filter signal level in the period, and
wherein, when one of the first and second pulse signal levels is changed within the predetermined period, a corresponding filter sets a corresponding one of first and second logic retaining periods in a corresponding filter signal, wherein a corresponding filter signal level is maintained to a previous value during the corresponding one of the first and second logic retaining periods, wherein the previous value is the filter signal level before the change, and wherein the corresponding one of the first and second logic retaining periods is set after the change until the predetermined period elapses;
a phase difference compensation deciding element for deciding whether an end of one of the first and second logic retaining periods set in a leading one of the first and second filter signals is later than an end of the other one of the first and second logic retaining periods set in a following one of the first and second filter signals, wherein a noise occurs within the predetermined period so that the leading one precedes the following one;
a phase difference compensation executing element for outputting first and second phase difference compensation output signals corresponding to the first and second filter signals, respectively,
wherein, when the phase difference compensation deciding element determines that the end of the one set in the leading one is later than the end of the other one set in the following one, the phase difference compensation executing element postpones the end of the other one set in the following one to be equal to or later than the end of the one set in the leading one so that a phase relationship between the first and second filter signals after decision of the phase difference compensation deciding element is equal to a phase relationship between the first and second filter signals just before the decision of the phase difference compensation deciding element, and the phase difference compensation executing element outputs the first and second filter signals as the first and second phase difference compensation output signals, respectively, and
wherein, when the phase difference compensation deciding element determines that the end of the one set in the leading one is not later than the end of the other one set in the following one, the phase difference compensation executing element directly outputs the first and second filter signals as the first and second phase difference compensation output signals, respectively;
a rotation direction deciding element for repeatedly deciding based on the phase relationship between the first and second phase difference compensation output signals whether a rotation direction of the rotor is a first direction or a second direction, which is opposite to the first direction; and
an output element for outputting an output signal, which relates to rotation information that includes decision of the rotation direction of the rotor.

10. The signal processing circuit according to claim 9,
wherein the output element outputs a third pulse signal having a variable pulse height as the output signal,
wherein, when the rotation direction deciding element decides that the rotation direction of the rotor is the first direction, the output element outputs the third pulse signal having a first pulse height, and
wherein, when the rotation direction deciding element decides that the rotation direction of the rotor is the second direction, the output element outputs the third pulse signal having a second pulse height, which is different from the first pulse height.

11. The signal processing circuit according to claim 9,
wherein the output element outputs a direction deciding signal having a variable direction deciding signal level as the output signal,
wherein, when the rotation direction deciding element decides that the rotation direction of the rotor is the first direction, the output element outputs the direction deciding signal having a first direction deciding signal level, and
wherein, when the rotation direction deciding element decides that the rotation direction of the rotor is the second direction, the output element outputs the direction deciding signal having a second direction deciding signal level, which is different from the first direction deciding signal level.

12. The signal processing circuit according to claim 9, wherein each of the plurality of sensor elements is a magnetoresistive element.

13. The signal processing circuit according to claim 9, wherein the object of detection is a cam shaft of an engine of a vehicle, and
wherein the rotor is coupled with the cam shaft via a gear so that the rotor rotates together with the cam shaft.

14. The signal processing circuit according to claim 9, wherein the object of detection is a crankshaft of an engine of a vehicle, and
wherein the rotor is a crank rotor.

15. A signal processing circuit for a rotation detector for detecting rotation of an object, comprising:
a plurality of sensor elements, each of which outputs a rotation signal having an individual phase for representing rotation of a rotor that rotates together with the object;
a plurality of waveform reshaping elements, each of which reshapes a corresponding rotation signal into a pulse signal;
a plurality of edge signal production elements, each of which detects at least one of an rising edge and a falling edge in a corresponding pulse signal, and outputs an edge signal corresponding to the at least one of the rising edge and the falling edge;
a rotating direction decision element that repeatedly decides based on a plurality of edge signals at every first time interval whether a rotating direction of the rotor is a first direction or a second direction, and that holds a decision result of the rotating direction during the first time interval, wherein the second direction is opposite to the first direction;
a reverse rotation decision element that repeatedly decides based on the plurality of edge signals at every second time interval whether the rotating direction of the rotor has been reversed; and
an output element that outputs an output signal based on the decision result of the rotating direction and a plurality of pulse signals, wherein the output signal corresponds to rotation information including the rotating direction of the rotor,
wherein, when the reverse rotation decision element decides that the rotating direction of the rotor has been reversed from the first direction to the second direction, the output element defines that the rotating direction is the first direction until the reverse rotation decision element decides successively predetermined times that the rotating direction has not been reversed after the reverse rotation decision element decides that the rotating direction has been reversed; and
wherein, when the reverse rotation decision element decides successively the predetermined times that the rotating direction has not been reversed after the reverse rotation decision element decides that the rotating direction has been reversed, the output element defines that the rotating direction is the second direction.

16. The signal processing circuit according to claim 15, further comprising:
a clock,
wherein various process in the signal processing circuit is synchronously executed with the clock.

17. The signal processing circuit according to claim 15,
wherein the plurality of sensor elements includes first and second sensor elements,
wherein the first sensor element outputs a first rotation signal, and the second sensor element outputs a second rotation signal,
wherein the plurality of waveform reshaping elements includes first and second waveform reshaping elements,
wherein the first waveform reshaping element reshapes the first rotation signal, and outputs a first pulse signal, and the second waveform reshaping element reshapes the second rotation signal, and outputs a second pulse signal,
wherein the plurality of edge signal production elements includes first and second edge signal production elements, and
wherein the first edge signal production element detects an rising edge or a falling edge in the first pulse signal, and outputs a first edge signal, and the second edge signal production element detects an rising edge or a falling edge in the second pulse signal, and outputs a second edge signal.

18. The signal processing circuit according to claim 17,
wherein the second time interval is defined based on a time when the first edge signal production element detects the rising edge or the falling edge in the first pulse signal, and
wherein the reverse rotation decision element decides that the rotating direction of the rotor has been reversed when the second edge signal production element does not detect the rising edge nor the falling edge in the second pulse signal, or when the second edge signal production element successively twice detects the rising edge or the falling edge in the second pulse signal during the second time interval.

19. The signal processing circuit according to claim 17,
wherein the second time interval is defined based on a time when the second edge signal production element detects the rising edge or the falling edge in the second pulse signal, and
wherein the reverse rotation decision element decides that the rotating direction of the rotor has been reversed when the first edge signal production element does not detect the rising edge nor the falling edge in the first pulse signal, or when the first edge signal production element successively twice detects the rising edge or the falling edge in the first pulse signal during the second time interval.

20. The signal processing circuit according to claim 15, wherein the predetermined times represents twice.

21. The signal processing circuit according to claim 15,
wherein the output element outputs a third pulse signal having a variable pulse height as the output signal,
wherein the third pulse signal has a first pulse height when the rotating direction decision element decides that the rotating direction is the first direction,
wherein the third pulse signal has a second pulse height when the rotating direction decision element decides that the rotating direction is the second direction, and
wherein the first pulse height is different from the second pulse height.

22. The signal processing circuit according to claim 15,
wherein the output element outputs a direction decision signal having a variable signal level as the output signal,
wherein the direction decision signal has a first signal level when the rotating direction decision element decides that the rotating direction is the first direction, wherein the direction decision signal has a second signal level when the rotating direction decision element decides that the rotating direction is the second direction, and wherein the first signal level is different from the second signal level.

23. The signal processing circuit according to claim 15, each sensor element is a magnetoresistive element.

24. The signal processing circuit according to claim 15, wherein the object is a cam shaft of an in-vehicle engine, and wherein the rotor is coupled with the cam shaft via a gear so that the rotor rotates along with rotation of the cam shaft.

25. The signal processing circuit according to claim 15, wherein the object is a crankshaft of an in-vehicle engine, and wherein the rotor is a crank rotor.

26. A method for detecting rotation of an object comprising:

detecting rotation of a rotor, and outputting a plurality of rotation signals having individual phases, each of which represents the rotation of the rotor;

reshaping the plurality of rotation signals, and outputting a plurality of pulse signals, each of which corresponds to a respective rotation signal;

detecting at least one of an rising edge and a falling edge in each pulse signal, and outputting a plurality of edge signals, each of which corresponds to the at least one of the rising edge and the falling edge;

repeatedly deciding based on the plurality of edge signals at every first time interval whether a rotating direction of the rotor is a first direction or a second direction, and holding a decision result of the rotating direction during the first time interval, wherein the second direction is opposite to the first direction;

repeatedly deciding based on the plurality of edge signals at every second time interval whether the rotating direction of the rotor has been reversed;

outputting an output signal based on the decision result of the rotating direction and the plurality of pulse signals, wherein the output signal corresponds to rotation information including the rotating direction of the rotor;

defining that the rotating direction is the first direction until it is decided successively twice that the rotating direction has not been reversed after it is decided that the rotating direction of the rotor has been reversed from the first direction to the second direction; and defining that the rotating direction is the second direction when it is decided successively twice that the rotating direction has not been reversed after it is decided that the rotating direction has been reversed.

* * * * *